(12) United States Patent
Lee et al.

(10) Patent No.: US 11,009,440 B2
(45) Date of Patent: May 18, 2021

(54) MICROHEATER INTEGRATED TEMPERATURE CONTROLLABLE MICROFLUIDIC TENSIOMETER FOR MEASURING DYNAMIC INTERFACIAL TENSION

(71) Applicant: OKINAWA INSTITUTE OF SCIENCE AND TECHNOLOGY SCHOOL CORPORATION, Okinawa (JP)

(72) Inventors: Doojin Lee, Kunigami-gun (JP); Amy Shen Fried, Kunigami-gun (JP)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 203 days.

(21) Appl. No.: 16/311,342

(22) PCT Filed: Jun. 20, 2017

(86) PCT No.: PCT/JP2017/023322
§ 371 (c)(1),
(2) Date: Dec. 19, 2018

(87) PCT Pub. No.: WO2017/222079
PCT Pub. Date: Dec. 28, 2017

(65) Prior Publication Data
US 2019/0187034 A1  Jun. 20, 2019

Related U.S. Application Data

(60) Provisional application No. 62/352,664, filed on Jun. 21, 2016.

(51) Int. Cl.
| | | |
|---|---|---|
| *G01N 13/02* | (2006.01) |
| *B01L 3/00* | (2006.01) |
| *B01L 7/00* | (2006.01) |

(52) U.S. Cl.
CPC ........ *G01N 13/02* (2013.01); *B01L 3/502707* (2013.01); *B01L 7/00* (2013.01);
(Continued)

(58) Field of Classification Search
CPC .................. G01N 13/00; G01N 13/02; G01N 2013/0216; G01N 2013/0283; B01L 7/00;
(Continued)

(56) References Cited

U.S. PATENT DOCUMENTS

| | | | | |
|---|---|---|---|---|
| 2004/0185681 A1* | 9/2004 | Wong | ................ | H01L 21/02672 |
| | | | | 438/799 |
| 2005/0142036 A1* | 6/2005 | Kim | .......................... | B01L 7/00 |
| | | | | 422/504 |

(Continued)

FOREIGN PATENT DOCUMENTS

| | | |
|---|---|---|
| JP | 2006-297198 A | 11/2006 |
| WO | 2015/028885 A2 | 3/2015 |
| WO | 2016/065242 A1 | 4/2016 |

OTHER PUBLICATIONS

Extended (supplementary) European Search Report dated May 29, 2019, issued in counterpart EP Application No. 17815544.6. (11 pages).

(Continued)

*Primary Examiner* — Benjamin R Schmitt
(74) *Attorney, Agent, or Firm* — Westerman, Hattori, Daniels & Adrian, LLP

(57) ABSTRACT

A temperature-controllable microfluidic device includes: a microfluidic channel generally extending in a first direction for passing a specimen fluid; a microheater disposed along
(Continued)

the microfluidic channel, the microheater being made of a resistive wire having a pair of serpentine-shaped portions generally extending in the first direction along respective sides of the microfluidic channel; and a temperature sensor disposed along the microfluidic channel, the temperature sensor being made of a resistive wire having a pair of serpentine-shaped portions generally extending in the first direction along the respective sides of the microfluidic channel.

13 Claims, 12 Drawing Sheets

(52) U.S. Cl.
CPC ......... *B01L 7/54* (2013.01); *B01L 2300/0627* (2013.01); *B01L 2300/0663* (2013.01); *B01L 2300/0816* (2013.01); *B01L 2300/1827* (2013.01); *G01N 2013/0216* (2013.01)

(58) Field of Classification Search
CPC ................. B01L 7/54; B01L 3/502707; B01L 2300/0816; B01L 2300/0627; B01L 2300/0663; B01L 2300/1827
USPC .............................................. 73/64.48, 64.55
See application file for complete search history.

(56) References Cited

U.S. PATENT DOCUMENTS

| | | | |
|---|---|---|---|
| 2016/0216163 A1* | 7/2016 | Lin | ...................... G01K 17/006 |
| 2016/0245790 A1* | 8/2016 | Kawai | ..................... B01L 7/525 |

OTHER PUBLICATIONS

International Search Report dated Sep. 12, 2017, issued in counterpart application No. PCT/JP2017/023322 (3 pages).
Written Opinion dated Sep. 12, 2017, issued in counterpart application No. PCT/JP2017/023322 (4 pages).
Murshed et al., "Temperature dependence of interfacial properties and viscosity of nanofluids for droplet-based microfluidics", Journal of Physics D: Applied Physics, IOP Publishing, 2008, vol. 41, 085502, pp. 1-5, cited in ISR (5 pages).
Nguyen et al., "Thermally mediated droplet formation in microchannels", Applied Physics Letters, 2007, vol. 91, Issue. 8, 084102, pp. 1-3, cited in ISR (3 pages).
Nie et al., "Emulsification in a microfluidic flow-focusing device: effect of the viscosities of the liquids", Microfluid and Nanofluid, Mar. 2008, vol. 5, Issue. 5, pp. 585-594, cited in ISR (10 pages).
Hudson et al., "Microfluidic interfacial tensiometry", Appl. Phys. Lett., 2005, vol. 87, Issue. 8, 081905, pp. 1-3, The American Institute of Physics, cited in ISR and Specification (4 pages).
Whitesides, "The origins and the future of microfluidics", Nature, Jul. 2006, vol. 442, pp. 368-373, cited in Specification (6 pages).
Teh et al., "Droplet microfluidics", Lab Chip, 2008, 8, pp. 198-220, The Royal Society of Chemistry, cited in Specification (23 pages).
Mak et al., "Musical Interfaces: Visualization and Reconstruction of Music with a Microfluidic Two-Phase Flow", Scientific Reports, 2014, 14, 6675, pp. 1-7, cited in Specification (7 pages).
Li et al., "Syringe-pump-induced fluctuation in all-aqueous microfluidic system implications for flow rate accuracy", Lab Chip, 2014, 4, pp. 744-749, The Royal Society of Chemistry, cited in Specification (6 pages).
Krägel et al., "Influence of the interfacial dynamics of surface active substances on the rheological behaviour of fluid interfaces", DECHEMA Monographs, 2000, vol. 136, pp. 109-140, cited in Specification (1 page).

Steegmans et al., "Dynamic Interfacial Tension Measurements with Microfluidic Y-Junctions", Langmuir Article, 2009, 25, pp. 9751-9758, American Chemical Society, cited in Specification (8 pages).
Gallaire et al., "Thermocapillary manipulation of microfluidic droplets: Theory and applications", International Journal of Heat and Technology, 2008, 26, pp. 161-166, cited in Specification (7 pages).
Nguyen et al., "Sample Transport with Thermocapillary Force for Microfluidics", Journal of Physics: Conference Series, 2006, 34, pp. 967-972, Institute of Physics Publishing, cited in Specification (7 pages).
Cordero et al., "Thermocapillary manipulation of droplets using holographic beam shaping: Microfluidic pin ball", Appl. Phys. Lett, 2008, 93, 034107, pp. 1-3, The American Institute of Physics, cited in Specification (4 pages).
Drelich et al., "Measurement of interfacial tension in Fluid-Fluid Systems", Encyclopedia of Surface and Colloid Science, Jan. 2002, 3, pp. 3152-3166, cited in Specification (16 pages).
Brosseau et al., "Microfluidic Dynamic Interfacial Tensiometry (μDIT)", Soft Matter, 2014, 10, pp. 3066-3076, The Royal Society of Chemistry,cited in Specification (11 pages).
Yakhshi-Tafti et al., "Measurement of Surface Interfacial Tension as a Function of Temperature Using Pendant Drop Images", International Journal of Optomechatronics, 2011, 5, pp. 393-403, Taylor & Francis Group, LLC, cited in Specification (12 pages).
Song et al., "Determination of Interfacial Tension from the Profile of a Pendant Drop Using Computer-Aided Image Processing", Journal of Colloid and Interface Science, 1996, 184, Article No. 0597, pp. 64-76, Academic Press, Inc., cited in Specification (13 pages).
Tsai et al., "Microfluidic ultralow interfacial tensiometry with magnetic particles", Lab Chip, 2013, 13, pp. 119-125, The Royal Society of Chemistry, cited in Specification (7 pages).
Baret et al., "Kinetic Aspects of Emulsion Stabilization by Surfactants: A Microfluidic Analysis", Langmuir Article, 2009, 25, pp. 6088-6093, American Chemical Society, cited in Specification (6 pages).
Moiré et al., "A New Microfluidic Tensiometer for Optimizing EOR Formulations", SPE Improved Oil Recovery Conference, Apr. 2016, SPE-179557-MS, pp. 1-14, cited in Specification (14 pages).
Gu et al., "Interfacial tension measurements with microfluidic tapered channels", Colloids and Surfaces A: Physicochem. Eng. Aspects, 2011, 389, pp. 38-42, Elsevier, cited in Specification (5 pages).
Ruiter et al., "Use of electrowetting to measure dynamic interfacial tensions of a microdrop", Lab Chip, 2012, 12, pp. 2832-2836, The Royal Society of Chemistry, cited in Specification (5 pages).
Hetsroni et al., "The flow fields in and around a droplet moving axially within a tube", J. Fluid Mech., 1970, vol. 41, part 4, pp. 689-705, cited in Specification (17 pages).
Zhou et al., "A facile microfluidic strategy for measuring interfacial tension", Appl. Phys. Lett., 2013, 103, 234102, pp. 1-4, the American Institute of Physics, cited in Specification (5 pages).
Bolognesi et al., "Microfluidic generation of monodisperse ultralow interfacial tension oil droplets in water", RSC Advances, 2015, 5, pp. 8114-8121, cited in Specification (8 pages).
Taylor et al., "The Formation of Emulsions in Definable Fields of Flow", Proc. Roy. Soc., 1879, vol. 29, pp. 501-523, Downloaded from http://rspa.royalsocietypublishing.org/ on Nov. 27, 2018, cited in Specification (26 pages).
Rallison, "The Deformation of Small Viscous Drops and Bubbles in Shear Flows", Ann. Rev. Fluid Mech., 1984, 16, pp. 45-66, cited in Specification (22 pages).
Resnik et al., "Experimental study of heat-treated thin film Ti/Pt heater and temperature sensor properties on a Si microfluidic platform", Journal of Micromechanics and Microengineering, 2011, 21, pp. 1-10, IOP Publishing, cited in Specification (11pages).
Yang et al., "An Independent, Temperature-Controllable Microelectrode Array", Anal. Chem., Mar. 2004, vol. 76, No. 5, pp. 1537-1543, American Chemical Society, cited in Specification (7 pages).
Liu et al., "Micro thermoindicators and optical-electronic temperature control for microfluidic applications", Appl. Phys. Lett., 2007, 91, 093513, pp. 1-3, cited in Specification (4 pages).

(56) References Cited

OTHER PUBLICATIONS

Bridle et al., "On-chip fabrication to add temperature control to a microfluidic solution exchange system", Lab Chip, 2008, 8, pp. 480-483, The Royal Society of Chemistry, cited in Specification (4 pages).

Bazargan et al., "Flow Control Using a Thermally Actuated Microfluidic Relay Valve", Journal of Microelectromechanical Systems, Oct. 2010, vol. 19, No. 5, pp. 1079-1087, IEEE, cited in Specification (9 pages).

Miralles et al., "A Review of Heating and Temperature Control in Microfluidic Systems: Techniques and Applications", Diagnostics, 2013, 3, pp. 33-67, cited in Specification (35 pages).

Fang et al., "Integrated microfluidic platform for instantaneous flow and localized temperature control", RSC Advances, 2015, 5, pp. 85620-85629, The Royal Society of Chemistry, cited in Specification (10 pages).

Cabral et al., "Microfluidic approach for rapid multicomponent interfacial tensiometry", Lab Chip, 2006, 6, pp. 427-436, The Royal Society of Chemistry, cited in Specification (10 pages).

Taylor, "The Viscosity of a Fluid Containing Small Drops of Another Fluid.", Proc. Roy. Soc. London, Ser. A, 1932, 138, pp. 41-48, cited in Specification (8 pages).

Roman et al., "Sol-Gel Modified Poly(dimethylsiloxane) Microfluidic Devices with High Electroosmotic Mobilities and Hydrophilic Channel Wall Characteristics", Anal. Chem., Mar. 2005, vol. 77, No. 5 pp. 1414-1422, American Chemical Society, cited in Specification (9 pages).

Pittman et al., "Experimental Studies of Electroosmotic Flow Dynamics in Microfabricated Devices during Current Monitoring Experiments", Analytical Chemistry, Feb. 2003, vol. 75, No. 3, pp. 361-370, cited in Specification (10 pages).

Samy et al., "Method for Microfluidic Whole-Chip Temperature Measurement Using Thin-Film Poly(dimethylsiloxane)/Rhodamine B", Analytical Chemistry, Jan. 2008, vol. 80, No. 2, pp. 369-375, cited in Specification (7 pages).

Kalenda et al., "Improved Chemical Resistance of Epoxy Resin-Based Coating Compositions", Dyes and Pigments, 1995, vol. 27, vol. 4, pp. 305-312, Elsevier, cited in Specification (8 pages).

Chen et al., "Application of a Temperature-Dependent Fluorescent Dye (Rhodamine B) to the Measurement of Radiofrequency Radiation-Induced Temperature Changes in Biological Samples", Bioelectromagnetics, 2009, 30, pp. 583-590, Wiley-Liss, Inc, cited in Specification (8 pages).

Metcalf et al., "Interfacial Tensions of Aged Organic Aerosol Particle Mimics Using a Biphasic Microfluidic Platform", Environmental Science & Technology, 2016, 50, 1251-1259, ACS Publications, cited in Specification (9 pages).

Astumian et al., "Interfacial Reaction Dynamics", The Journal of Physical Chemistry, 1985, vol. 89, No. 16, pp. 3477-3482, the American Chemical Society, cited in Specification (6 pages).

Zhang et al., "Molecular Orientation and Phase Separation by Controlling Chain Segment and Molecule Movement in P3HT/N2200 Blends", Macromolecules, 2016, 49, pp. 6987-6996, ACS Publications, cited in Specification (10 pages).

Office Action dated Feb. 24, 2021, issued in counterpart JP Application No. 2018-564441, with English Translation. (8 pages).

* cited by examiner

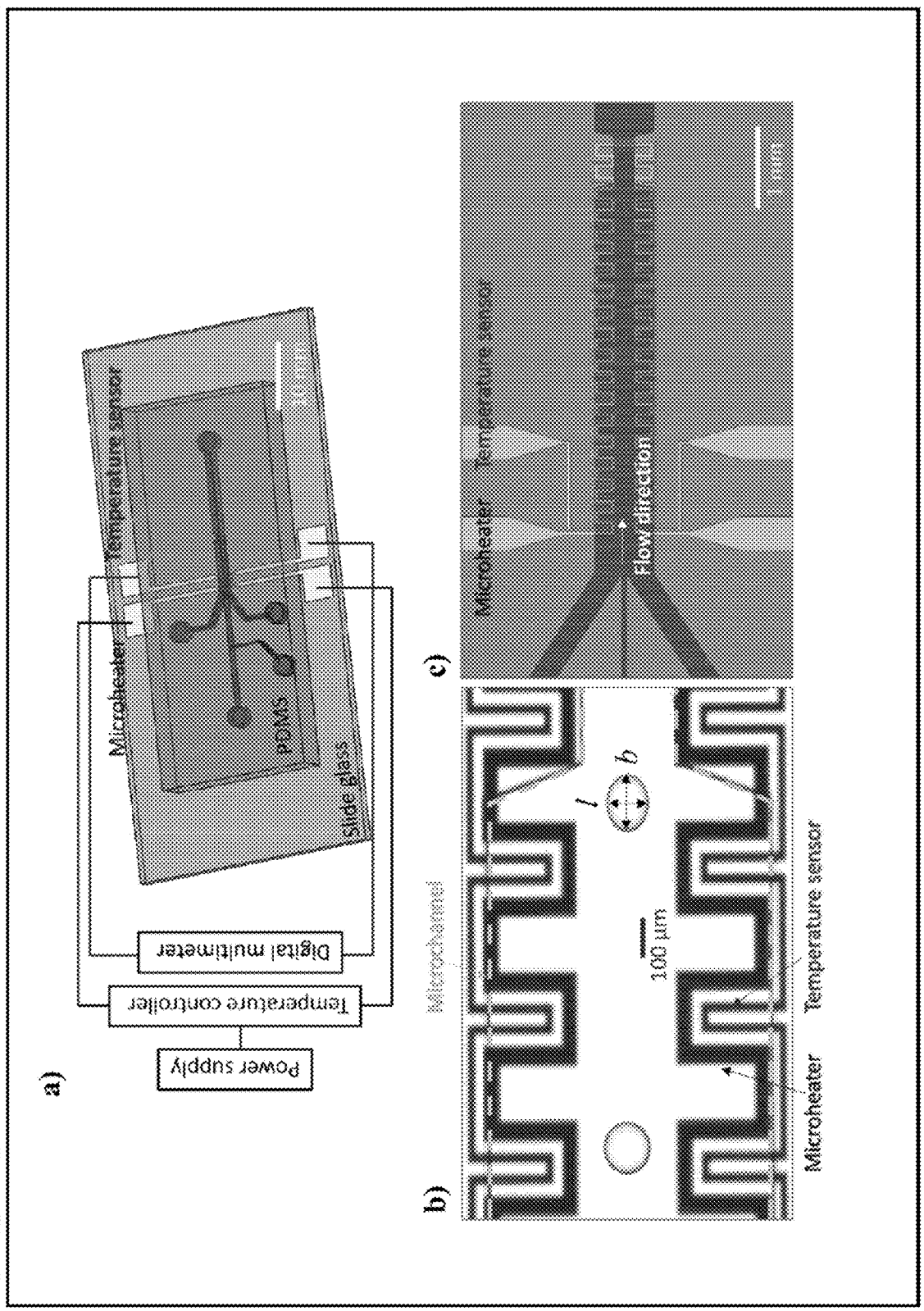
[Fig. 1]

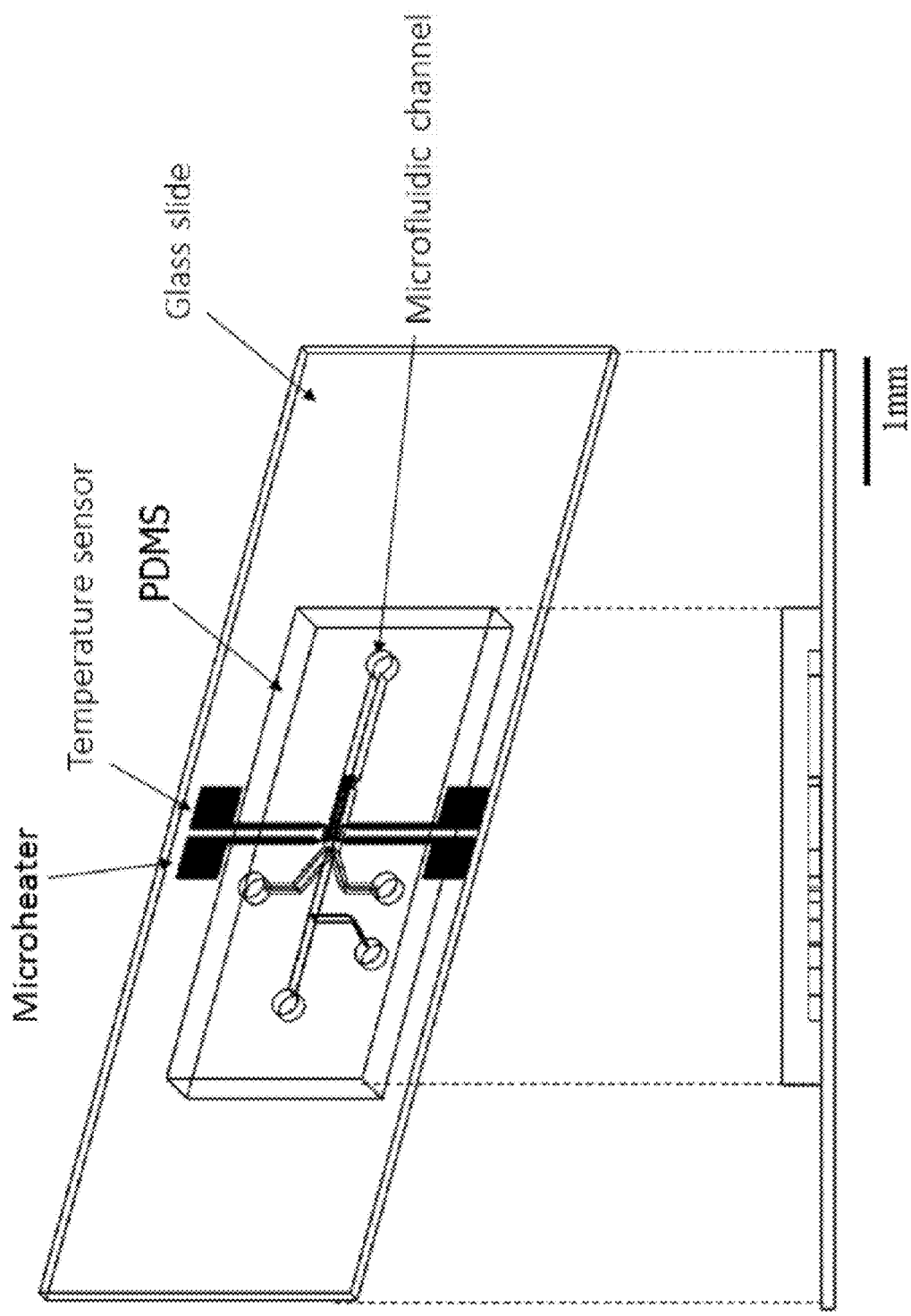
[Fig. 2(a)]

[Fig. 2(b)]
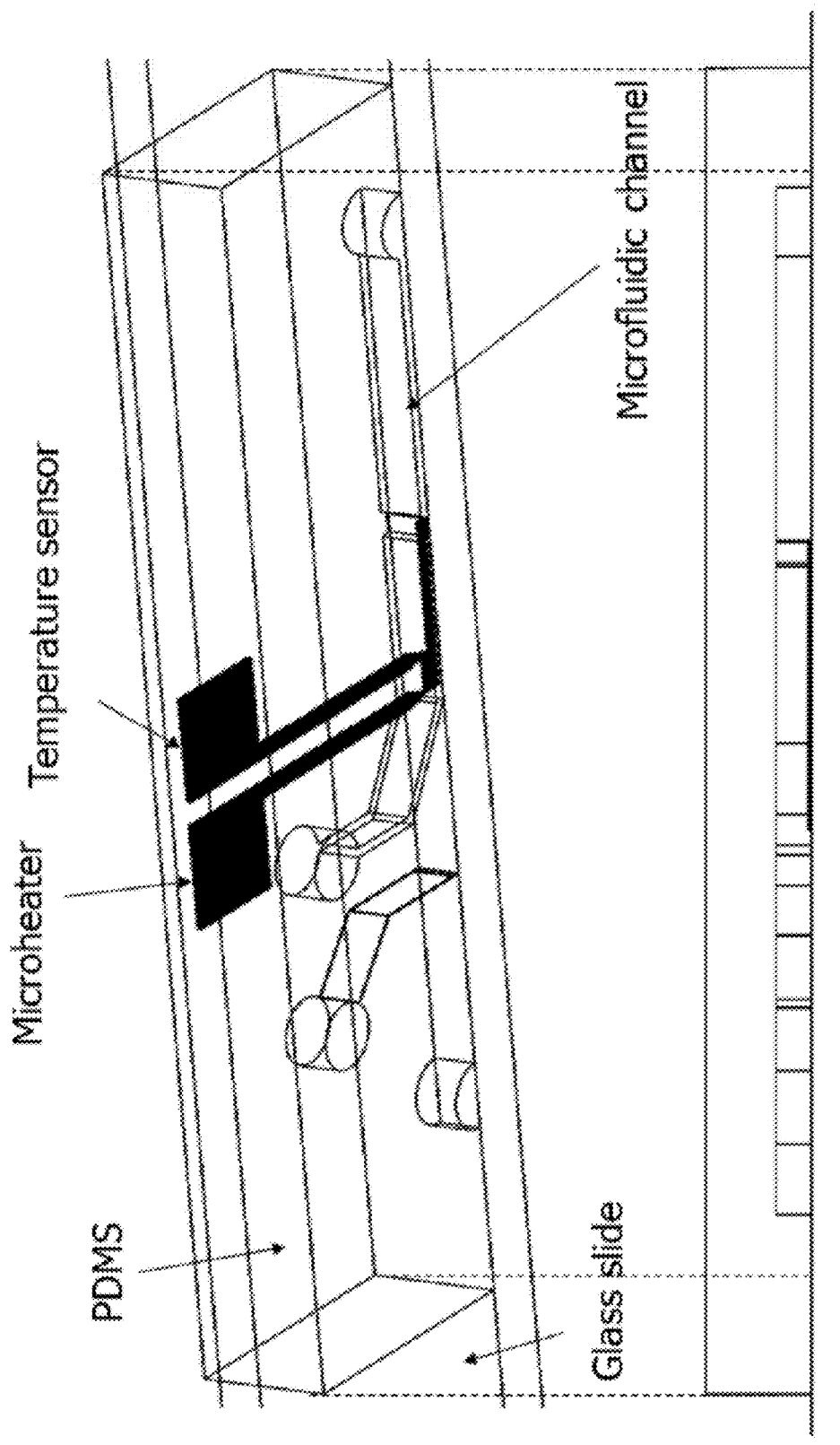

[Fig. 3]
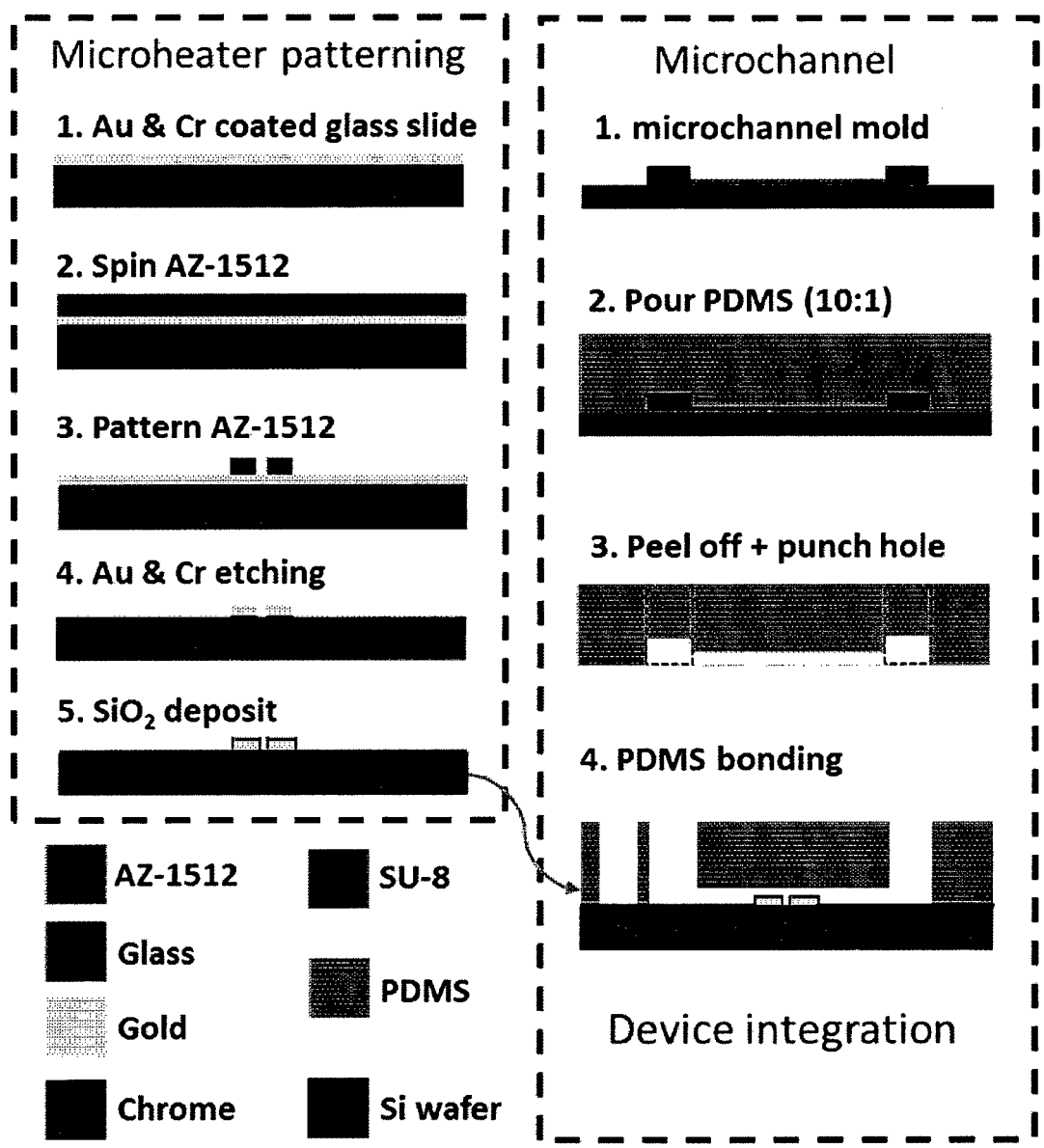

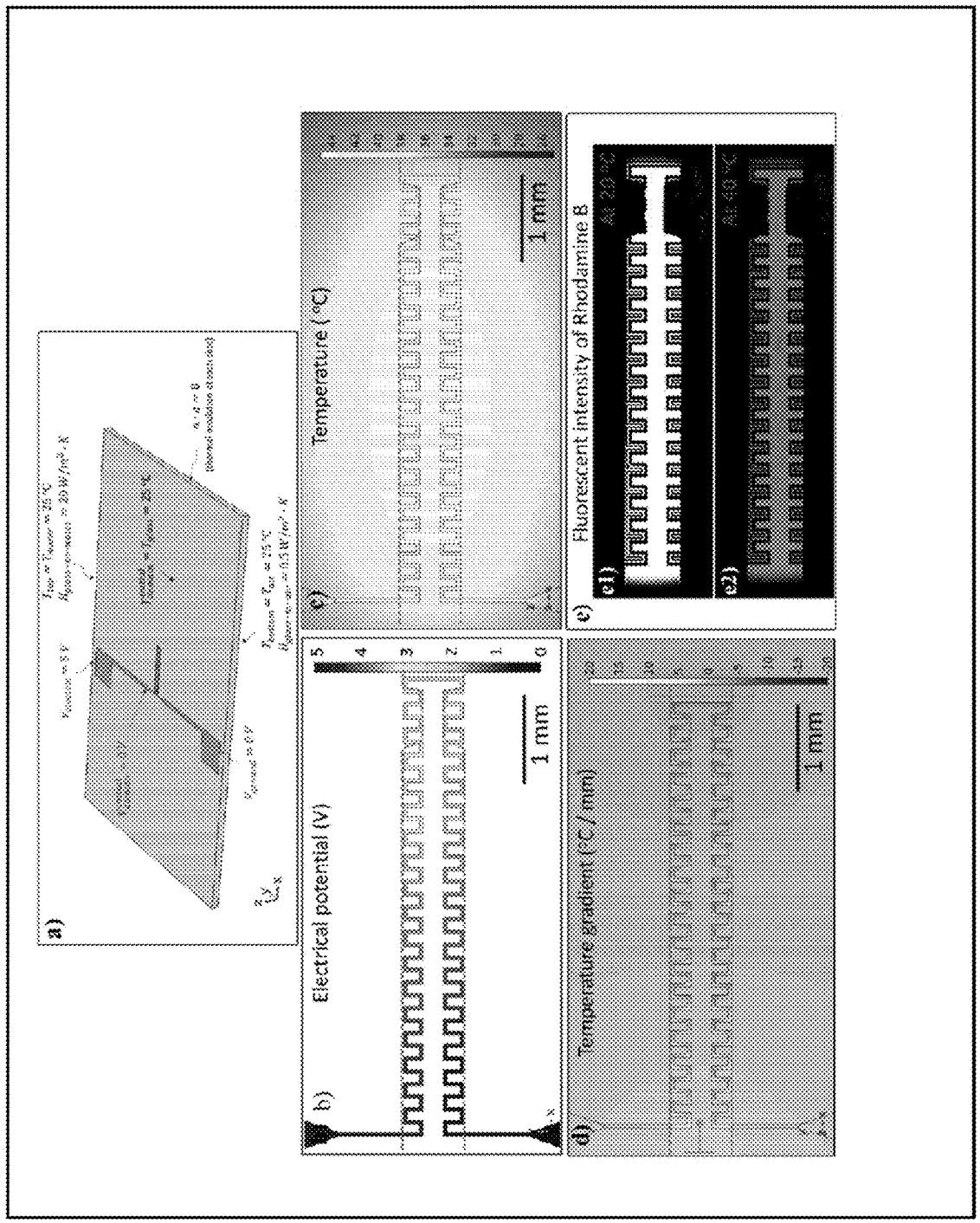
[Fig. 4]

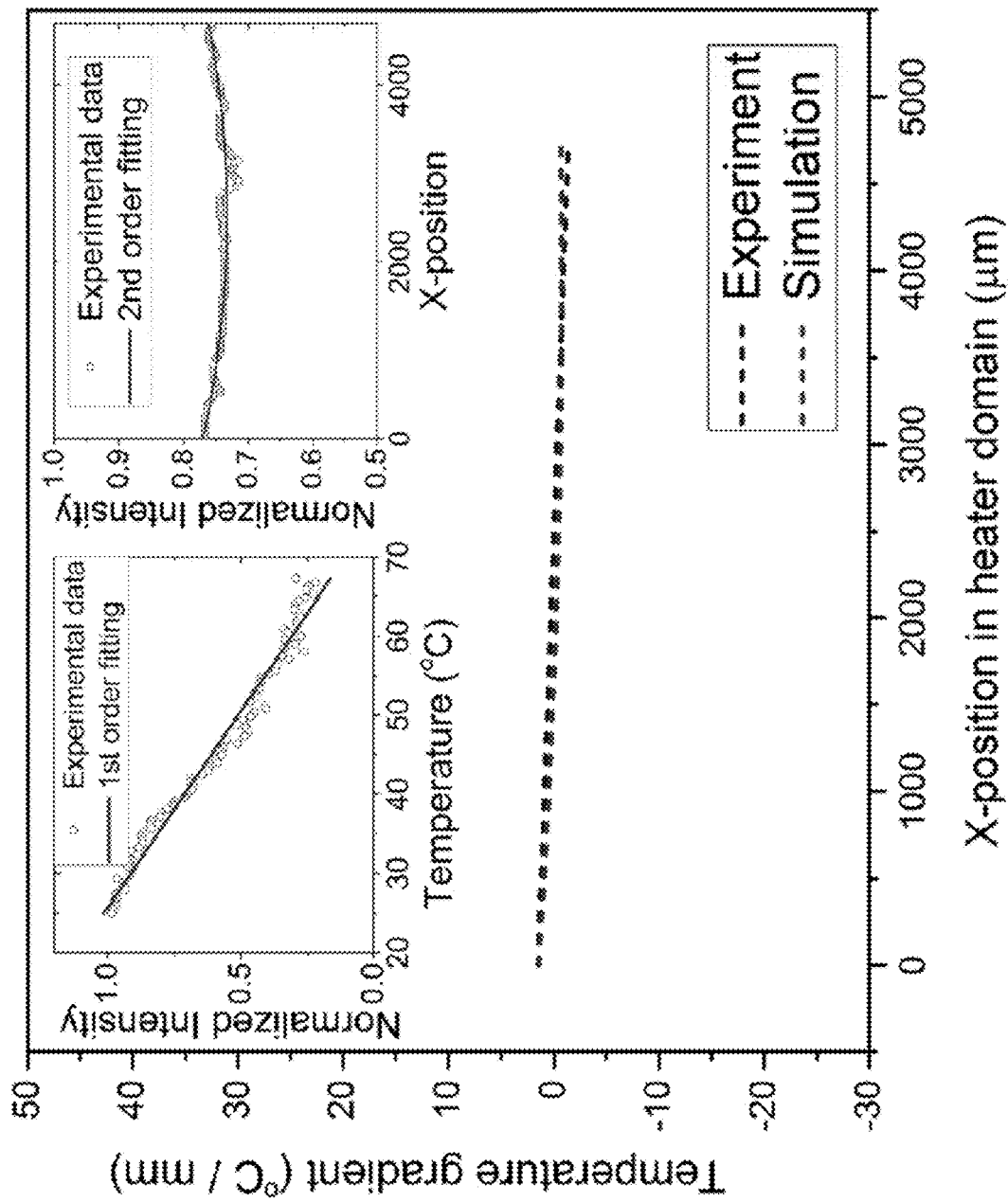
[Fig. 5(a)]

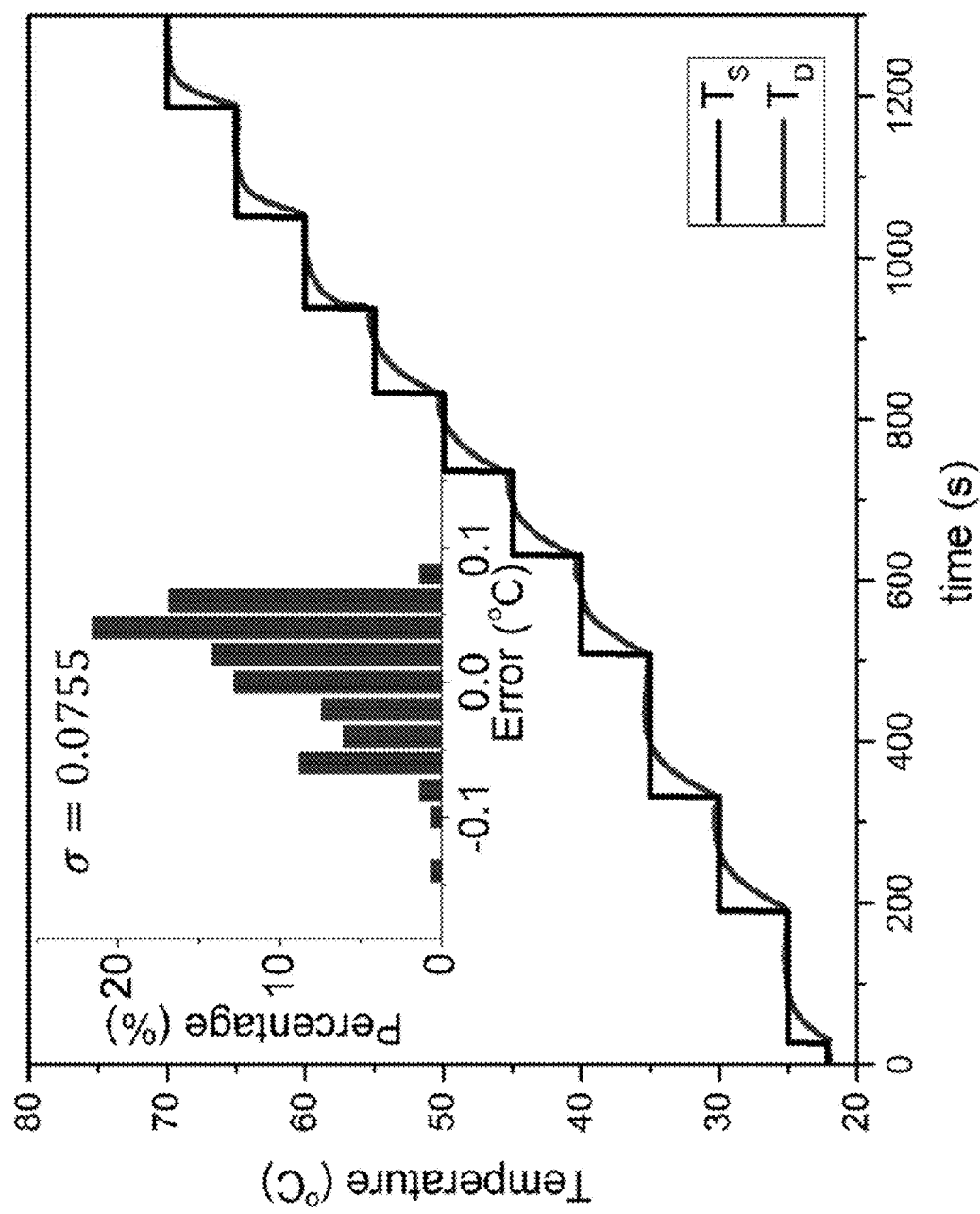
[Fig. 5(b)]

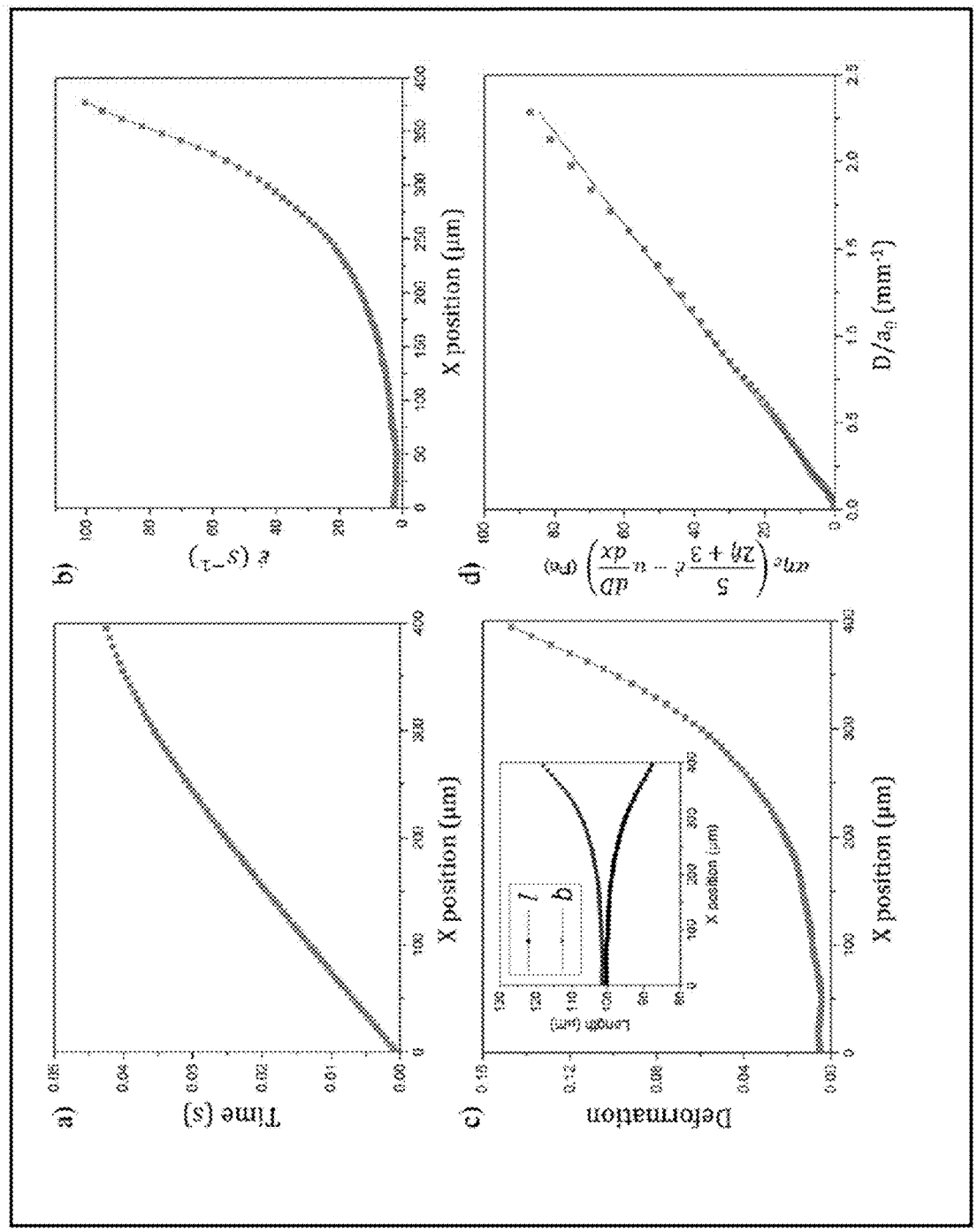
[Fig. 6]

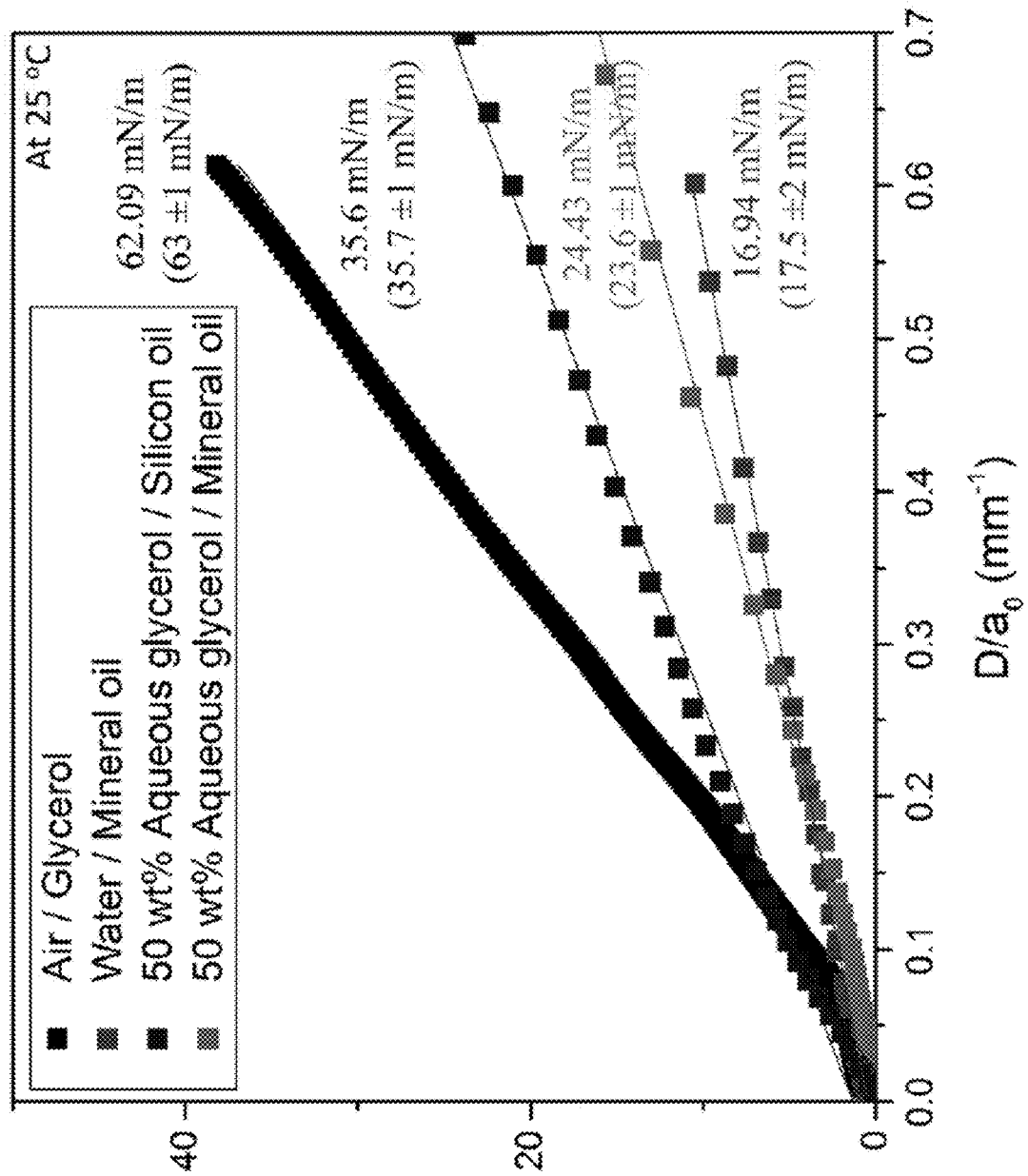
[Fig. 7]

[Fig. 8]
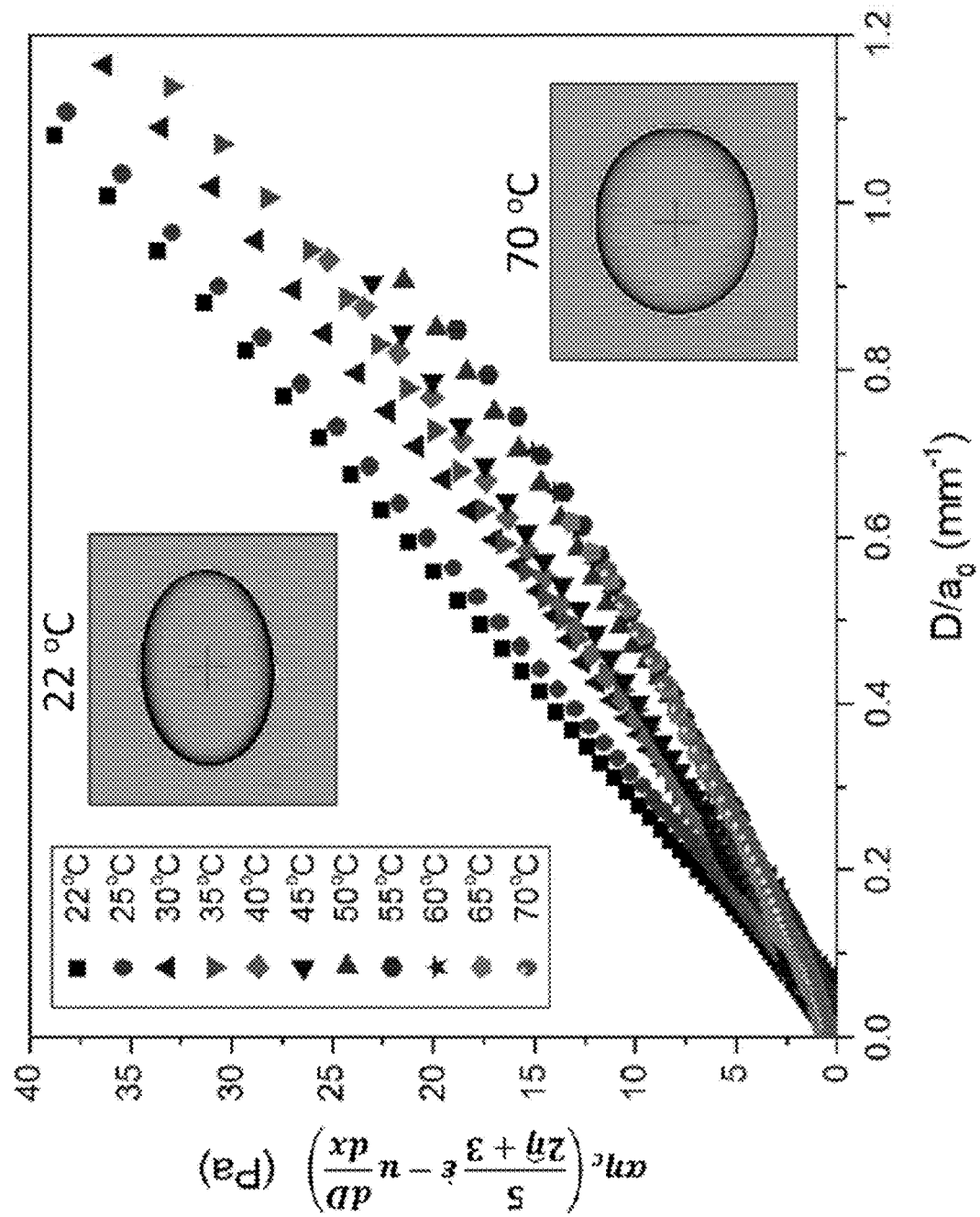

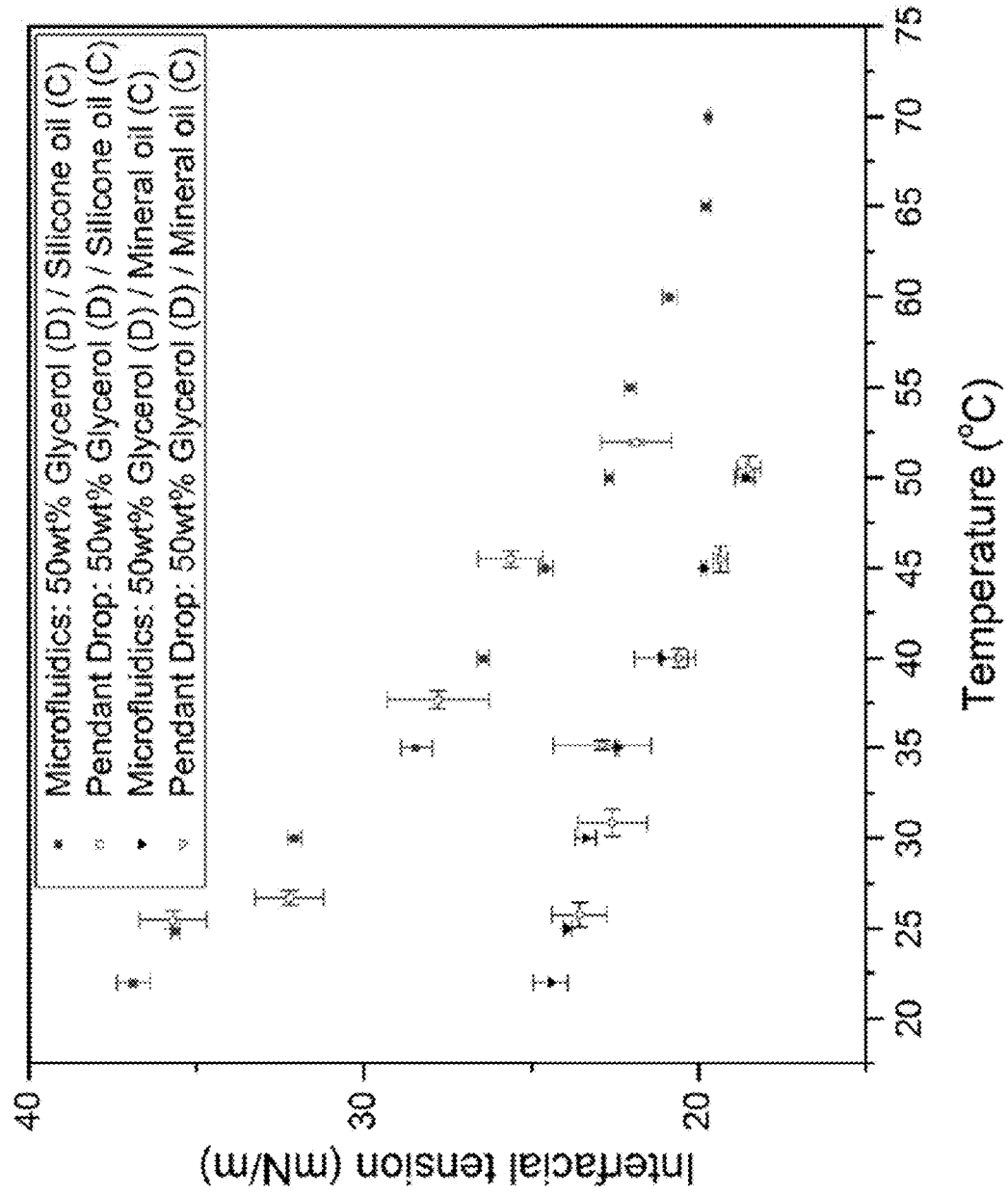
[Fig. 9(a)]

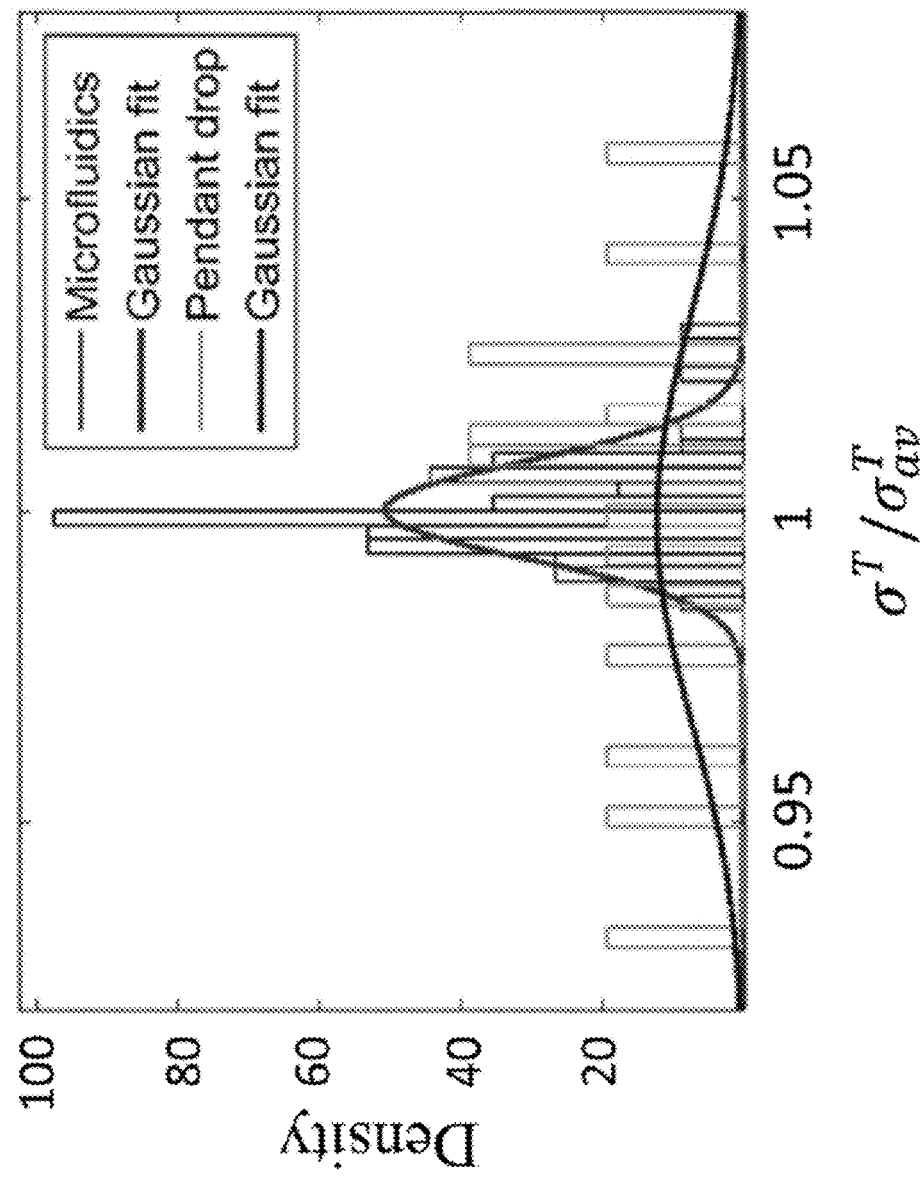
[Fig. 9(b)]

MICROHEATER INTEGRATED TEMPERATURE CONTROLLABLE MICROFLUIDIC TENSIOMETER FOR MEASURING DYNAMIC INTERFACIAL TENSION

This application claims the benefit of and hereby incorporates by reference U.S. Provisional Application No. 62/352,664, filed Jun. 21, 2016.

TECHNICAL FIELD

The present invention relates to interfacial measurements, and more particularly, to microfluidic devices for measuring dynamic interfacial tension between two liquids.

BACKGROUND ART

Interfacial tension (IFT) is an important physico-chemical property between two liquids to determine their morphology, stability, structure and multiphase flow dynamics. Measuring IFT is a delicate task since the apparatus or probes employed should not disturb the liquid-liquid interface and tiny amounts of dust or impurities can significantly affect the analysis. Accurate measurement of dynamic IFT between immiscible liquids is necessary to study transient behaviors of liquid interfaces, i.e., the adsorption of surface active components or solutes such as surfactants, salts, and nanoparticles. Under a fixed environmental temperature, the rate of interfacial tension variation primarily depends on the characteristics of surface active components (e.g., adsorption and diffusion coefficient), their concentration and the mass transfer mechanisms (e.g., diffusion and convection). Since the kinetics of adsorption and desorption processes takes place within sub-second time scales, the quantification of IFT has to be conducted within milliseconds to capture the interfacial dynamics properly. NPLs 1-6.

Interfacial tension, $\sigma_{ij}$, is related to the surface free energy and depends on temperature and pressure in a confined thermodynamic system. Here, i and j represent each liquid phase. For this reason, temperature dependency of interfacial tension has a significant effect at microscale where interfacial tension force outweighs inertial and gravitational forces. For example, thermal gradients in IFT help to drive a sample droplet in a channel, which is called the thermocapillary effect. Such phenomena have been reported as an effective and simple actuation of microfluidic drops. NPLs 7-9.

Conventional techniques for the measurement of IFT are mostly based on the drop shape analysis (e.g., pendant drop, sessile drop, and spinning drop) or the force balance (e.g., Wihelmy plate and Du Noüy ring) principles. The drop shape analysis involves the determination of the shape of drop or the profile of the meniscus under equilibrium. However, the drop shape methods have to create a droplet at the syringe outlet within one second, limiting the measurement accuracy when measurement time scales are beyond one second. The pendant drop method typically uses a hot plate or heating chamber to control the environmental temperature, which often causes asymmetric temperature distributions followed by temperature gradients that can cause thermal convection of the fluid in the fluid chamber, resulting in experimental errors. Moreover, at higher temperatures, convective motion of the fluid inside the fluid chamber causes refractive index changes resulting in shape distortions that reduce measurement accuracy. Finally, a tedious procedure is usually required to create spatially uniform temperatures within the chamber and at the syringe tip to avoid temperature gradients and the resultant thermal convection within the chamber. Consequently, the pendant drop method can lead to noisy data, and is also affected by vibration, thermal fluctuation, and contamination due to poorly confined experimental setup. Direct measurement of IFT by using a plate or ring is done by measuring the force required to separate the plate or ring from contact with the interface. This direct measurement, however, is susceptible to adsorption of organic compounds and evaporation of test solutions due to its open environment when measuring IFT. The evaporation of test solutions accelerates as temperature of the system increases, which may lead to experimental error while measuring temperature dependent IFT. Furthermore, both direct measurement and pendant drop methods rely on density difference between the two fluids for the calculation of IFT, which prevents IFT measurements for liquid pairs with small density differences. NPLs 10-13.

Since IFT force becomes more dominant at microscale length scales when compared to gravitational and inertial forces, microfluidic platforms possess particular advantages for IFT measurements. A co-flow microfluidic interfacial tensiometry with magnetic particles was developed to measure IFT, in which magnetic particles pass through or are trapped by the liquid-liquid interface. However, this technique is only limited to measure very low IFT ranging from $10^{-6}$ to $10^{-5}$ N/m. Droplet-based microfluidic tensiometry can capture transient interfacial tension at milliseconds with the requirement of small sample volume, low reagent and waste. It also has advantages of device portability, unique flow control, enhanced throughput, minimum contamination, easy manipulations of fluid compositions and coupling with external fields (e.g., electrowetting). Finally, the small length scales of the device also enable fast response of temperature when integrated with the temperature control unit. NPLs 10, 11, 14-22.

Hudson et al recently developed a novel droplet microfluidic platform for interfacial tension measurement at room temperature. This platform relies on Taylor's theory for droplet deformation in extensional flow fields in which a spherical droplet is first generated then deforms to an elongated ellipsoid shape due to the extensional stress on the droplet. The extensional stress is balanced by IFT at the liquid-liquid interface with spatial and temporal accuracy. A microfluidic method was also developed by other researchers for the measurement of surfactant adsorption kinetics based on empirical scaling equation. Using this approach, the adsorption kinetics was quantitatively measured at the sub-second timescale. However, in either case, existing microfluidic tensiometers operate only under room temperature even though temperature condition can greatly affect the interfacial dynamics. First, the temperature dependence on IFT and viscosity of liquids is a crucial parameter in droplet deformation because the drag force acting on the droplet is affected by fluid viscosities. Secondly, the adsorption kinetics also depends on the temperature. Therefore, monitoring and controlling temperature in the microfluidic platform is necessary to characterize the droplet deformation in relation with interfacial dynamics. NPLs 19, 23, 24.

CITATION LIST

Non Patent Literature

NPL 1: G. M. Whitesides, Nature, 2006, 442, 368-373.
NPL 2: S.-Y. Teh, R. Lin, L.-H. Hung and A. P. Lee, Lab Chip, 2008, 8, 198-220.

NPL 3: S. Y. Mak, Z. Li, A. Frere, T. C. Chan and H. C. Shum, Sci. Rep., 2014, 4, 6675.

NPL 4: Z. Li, S. Y. Mak, A. Sauret and H. C. Shum, Lab Chip, 2014, 14, 744-749.

NPL 5: J. Kragel, A. Makievski, V. Kovalchuk and R. Miller, Transportmechanisms across Fluid Interfaces: Influence of the Interfacial Dynamics of Surface Active Substances on the Rheological behavior of Fluid Interfaces, DECHEMA Monogr., 2000, 109-140.

NPL 6: M. L. Steegmans, A. Warmerdam, K. G. Schroen and R. M. Boom, Langmuir, 2009, 25, 9751-9758.

NPL 7: F. Gallaire, C. Baroud and J.-P. Delville, Heat Technol., 2008, 26, 161-166.

NPL 8: N.-T. Nguyen, W. W. Pang and X. Huang, J. Phys.: Conf. Ser., 2006, 967.

NPL 9: M. L. Cordero, D. R. Burnham, C. N. Baroud and D. McGloin, Appl. Phys. Lett., 2008, 93, 034107.

NPL 10: J. Drelich, C. Fang and C. White, Encycl. Surf. Colloid Sci., 2002, 3, 3158-3163.

NPL 11: Q. Brosseau, J. Vrignon and J.-C. Baret, Soft Matter, 2014, 10, 3066-3076.

NPL 12: E. Yakhshi-Tafti, R. Kumar and H. J. Cho, Int. J. Optomechatronics, 2011, 5, 393-403.

NPL 13: B. Song and J. Springer, J. Colloid Interface Sci., 1996, 184, 77-91.

NPL 14: S. S. Tsai, J. S. Wexler, J. Wan and H. A. Stone, Lab Chip, 2013, 13, 119-125.

NPL 15: J.-C. Baret, F. Kleinschmidt, A. El Harrak and A. D. Griffiths, Langmuir, 2009, 25, 6088-6093.

NPL 16: M. Moiré, Y. Peysson, N. Pannacci, B. Herzhaft, A. Colin and C. Dalmazzone, et al., SPE Improved Oil Recovery Conference, 2016.

NPL 17: H. Gu, M. H. Duits and F. Mugele, Colloids Surf., A 2011, 389, 38-42.

NPL 18: R. de Ruiter, P. Wennink, A. G. Banpurkar, M. H. Duits and F. Mugele, Lab Chip, 2012, 12, 2832-2836.

NPL 19: S. D. Hudson, J. T. Cabral, W. J. Goodrum, K. L. Beers and E. J. Amis, Appl. Phys. Lett., 2005, 87, 81905.

NPL 20: G. Hetsroni, S. Haber and E. Wacholder, J. Fluid Mech., 1970, 41, 689-705.

NPL 21: H. Zhou, Y. Yao, Q. Chen, G. Li and S. Yao, Appl. Phys. Lett., 2013, 103, 234102.

NPL 22: G. Bolognesi, A. Hargreaves, A. D. Ward, A. K. Kirby, C. D. Bain and O. Ces, RSC Adv., 2015, 5, 8114-8121.

NPL 23: G. Taylor, Proc. R. Soc. London, Ser. A, 1934, 146, 501-523.

NPL 24: J. Rallison, Annu. Rev. Fluid Mech., 1984, 16, 45-66.

NPL 25: D. Resnik, D. Vrtacnik, M. Mozek, B. Pecar and S. Amon, J. Micromech. Microeng., 2011, 21, 018301.

NPL 26: H. Yang, C. A. Choi, K. H. Chung, C. H. Jun and Y. T. Kim, Anal. Chem., 2004, 76, 1537-1543.

NPL 27: L. Y. Liu, S. L. Peng, W. J. Wen and P. Sheng, Appl. Phys. Lett., 2007, 91, 093513.

NPL 28: H. Bridle, M. Millingen and A. Jesorka, Lab Chip, 2008, 8, 480-483.

NPL 29: V. Bazargan and B. Stoeber, J. Microelectromech. Syst., 2010, 19, 1079-1087.

NPL 30: V. Miralles, A. Huerre, F. Malloggi and M.-C. Jullien, Diagnostics, 2013, 3, 33-67.

NPL 31: C. Fang, D. Lee, B. Stober, G. G. Fuller and A. Q. Shen, RSC Adv., 2015, 5, 85620-85629.

NPL 32: J. T. Cabral and S. D. Hudson, Lab Chip, 2006, 6, 427-436.

NPL 33: G. I. Taylor, Proc. R. Soc. London, Ser. A, 1932, 138, 41-48.

NPL 34: G. T. Roman, T. Hlaus, K. J. Bass, T. G. Seelhammer and C. T. Culbertson, Anal. Chem., 2005, 77, 1414-1422.

NPL 35: J. L. Pittman, C. S. Henry and S. D. Gilman, Anal. Chem., 2003, 75, 361-370.

NPL 36: R. Samy, T. Glawdel and C. L. Ren, Anal. Chem., 2008, 80, 369-375.

NPL 37: P. Kalenda and A. Kalendová, Dyes Pigm., 1995, 27, 305-312.

NPL 38: Y. Y. Chen and A. W. Wood, Bioelectromagnetics, 2009, 30, 583-590.

NPL 39: A. R. Metcalf, H. C. Boyer and C. S. Dutcher, Environ. Sci. Technol., 2016, 50, 1251-1259.

NPL 40: R. Astumian and P. Chock, J. Phys. Chem., 1985, 89, 3477-3482.

NPL 41: R. Zhang, H. Yang, K. Zhou, J. Zhang, X. Yu, J. Liu and Y. Han, Macromolecules, 2016, 49, 6987-6996.

SUMMARY OF INVENTION

Technical Problem

Existing localized temperature control methods with high temperature precision are either micropattening wire on silicon or on glass embedded in the device. However, achieving precise localized temperature control in a small and confined area remains difficult. Recently, microfabrication technology has offered a new venue to create micron sized features to provide temperature ramp ranging from 0.1 to 20° C. per second and create constant temperature gradients along the channel direction, which allows accurate temperature control in microfluidic platforms. A group that includes the present inventors recently designed an integrated microfluidic platform with instantaneous flow and localized temperature control (NPL 31). Precise control of the temperature within a local region as small as ±0.25° C. deviation was successfully achieved on chip in the temperature range from 25 to 95° C. In the previous work, a microheater with the width of 20 µm within a cross slot device was designed, enabling the temperature range of 25-95° C. However, in this work, the width of the microheater is 40 µm. In reality, the temperature range in our microdevice is related to the microheater material and its size/width in the microdevice. In fact, the upper temperature limit in our microfluidic tensiometer is 70° C. based on the 40 µm width of the microheater. The integrated microfluidic device also allows low thermal convection and spatial temperature variation in the device, which can be very advantageous for transient and dynamic measurement of IFT. To the best of the present inventors' knowledge, there is no report on temperature controlled microfluidic tensiometry to investigate temperature dependence between the droplet deformation and dynamic IFT through the device. NPLs 25-31.

An object of the present invention is to provide a new and improved microfluidic tensiometry so as to obviate one or more of the problems of the existing art.

Solution to Problem

To achieve these and other advantages and in accordance with the purpose of the present invention, as embodied and broadly described, in one aspect, the present invention provides a temperature-controllable microfluidic device, comprising: a microfluidic channel generally extending in a first direction for passing a specimen fluid; a microheater disposed along the microfluidic channel, the microheater being made of a resistive wire having a pair of serpentine-shaped portions generally extending in the first direction along respective sides of the microfluidic channel; and a temperature sensor disposed along the microfluidic channel, the temperature sensor being made of a resistive wire having a pair of serpentine-shaped portions generally extending in the first direction along the respective sides of the microfluidic channel.

In the temperature-controllable microfluidic device described above, said pair of serpentine-shaped portions of the temperature sensor may be disposed alongside said pair of serpentine-shaped portions of the microheater at outer sides thereof relative to the microfluidic channel.

In the temperature-controllable microfluidic device described above, said pair of serpentine-shaped portions of the temperature sensor and said pair of serpentine-shaped portions of the microheater may both have a rectangular wave shape.

In the temperature-controllable microfluidic device described above, said microheater and said temperature sensor may be disposed on a glass substrate, and said microfluidic channel may be defined by a patterned block disposed on the glass substrate.

In the temperature-controllable microfluidic device described above, the microfluidic channel may have a constriction portion having a width narrower than a main portion of the microfluidic channel.

In another aspect, the present invention provides a method of measuring temperature-dependent interfacial tensions between two liquids using a microfluidic device, said microfluidic device comprising: a microfluidic channel generally extending in a first direction for passing a specimen fluid, microfluidic channel having a constriction portion having a width narrower than a main portion of the microfluidic channel; a microheater disposed along the main portion of the microfluidic channel, the microheater being made of a resistive wire having a pair of serpentine-shaped portions generally extending in the first direction along respective sides of the main portion of the microfluidic channel; and a temperature sensor disposed along the main portion of the microfluidic channel, the temperature sensor being made of a resistive wire having a pair of serpentine-shaped portions generally extending in the first direction along the respective sides of the main portion of the microfluidic channel, wherein the method comprises: introducing a mixture of two liquids in the microfluidic channel so as to form a droplet of one liquid immersed in another liquid and move the droplet in the first direction; driving the microheater and feed-back controlling and regulating temperature inside the microfluidic channel by monitoring the temperature via the temperature sensor; imaging a deformation of the droplet as the droplet moves in the microfluidic channel using an imaging device; and calculating an interfacial tension between the two liquids in accordance with the deformation of the droplet imaged by the imaging device.

In the method described above, said pair of serpentine-shaped portions of the temperature sensor may be disposed alongside said pair of serpentine-shaped portions of the microheater at outer sides thereof relative to the microfluidic channel.

In the method described above, said pair of serpentine-shaped portions of the temperature sensor and said pair of serpentine-shaped portions of the microheater may both have a rectangular wave shape.

In the method described above, said microheater and said temperature sensor may be disposed on a glass substrate, and said microfluidic channel may be defined by a patterned block disposed on the glass substrate.

In another aspect, the present invention provides a temperature-controllable microfluidic tensiometer for measuring interfacial tensions between two fluids, comprising: a microfluidic channel generally extending in a first direction for passing a specimen fluid having a droplet of one liquid immersed in another liquid, the microfluidic channel having a constriction portion having a width narrower than a main portion of the microfluidic channel; a microheater disposed along the main portion of microfluidic channel, the microheater being made of a resistive wire having a pair of serpentine-shaped portions generally extending in the first direction along respective sides of the main portion of the microfluidic channel; a temperature sensor disposed along the main portion of the microfluidic channel, the temperature sensor being made of a resistive wire having a pair of serpentine-shaped portions generally extending in the first direction along the respective sides of the main portion of the microfluidic channel; one or more controllers connected to the microheater and the temperature sensor to drive the microheater and detect temperature in the microfluidic channel via the temperature sensor, the one or more controllers feed-back controlling and regulating the temperature; and an imaging device that takes images of the droplet as the droplet moves in the microfluidic channel.

In the temperature-controllable microfluidic tensiometer described above, said pair of serpentine-shaped portions of the temperature sensor may be disposed alongside said pair of serpentine-shaped portions of the microheater at outer sides thereof relative to the microfluidic channel.

In the temperature-controllable microfluidic tensiometer described above, said pair of serpentine-shaped portions of the temperature sensor and said pair of serpentine-shaped portions of the microheater may both have a rectangular wave shape.

In the temperature-controllable microfluidic tensiometer described above, wherein said microheater and said temperature sensor may be disposed on a glass substrate, and said microfluidic channel may be defined by a patterned block disposed on the glass substrate.

Advantageous Effects of Invention

According to one or more aspects of the present invention, it becomes possible to perform measurements of interfacial tensions between two liquids in a convenient, reliable and accurate scheme.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory, and are intended to provide further explanation of the invention as claimed.

BRIEF DESCRIPTION OF DRAWINGS

FIG. 1 schematically shows a construction of microfluidic tensiometer according to an embodiment of the present disclosure. In FIG. 1, a) is a schematic perspective view of the device, b) is an enlarged view of a microchannel in which droplets travel, and c) is an enlarged top view of the device.

FIG. 2 shows more details of the device of this embodiment. In FIG. 2, a) is a perspective view of the device, and b) is a perspective view of a cut-out cross-section of the device.

FIG. 3 schematically shows manufacturing processes of the device of the embodiment of the present invention by illustrating cross-sectional views in each representative step.

FIG. 4 shows simulation conditions as well as the results of the numerical simulation. In FIG. 4, a) shows boundary and initial conditions imposed in solving the heat transfer equation; b) shows resulting electric field potential; c) temperature distribution, and d) temperature gradient distribution, obtained by the numerical simulations. In FIG. 4, e) shows the fluorescence intensity of Rhodamine B in aqueous solutions inside the epoxy based microchip, captured using a fluorescence microscope at 20° C. and 40° C.

FIG. 5 shows temperature validation and control through the integrated device. In FIG. 5, a) shows temperature gradient along the centerline in the microheater obtained by numerical simulation and experiment at 40° C., and b) shows the set temperatures ($T_S$) that were varied from room temperature to 70° C., and the resulting detected temperature ($T_D$) measured by the temperature sensor. The inset graph in b) denotes a histogram of localized temperature control error once $T_D$ reaches $T_S$.

FIG. 6 shows various data concerning real-time droplet tracking to obtain interfacial tension between silicone oil (continuous phase) and 50 wt % glycerol (dispersed phase) at room temperature. In FIG. 6, a) shows transit time t(x); b) shows extension rate ($\varepsilon^{-1}$) along the center-of-mass of a droplet; c) shows dimensionless deformation parameter D normalized by drop size $a_0$ (inset graph represents minimum and maximum droplet diameters); d) shows experimental data collected during a time interval, with the slope representing the interfacial tension a based on Eq 3, in which the solid line is the linear curve fit.

FIG. 7 shows data for interfacial tension measurement of four individual droplets (water, aqueous glycerol or air) in different carrier fluids at room temperature; the droplet deformation $D/a_0$ is imaged and calculated as the droplet travels through the microfluidic device. The solid lines are linear regressions to the experimental data for each individual droplet, with the slope representing the interfacial tension (mN m$^{-1}$). The data in parentheses were obtained by the pendant drop method.

FIG. 8 is a Taylor plot showing experimental analysis of 50 wt % aqueous glycerol droplet deformation in silicone oil at various temperatures; droplet deformation decreases as the temperature of the system increase. The Taylor plot shown in FIG. 8 indicates that the slope (equivalent to interfacial tension) decreases with increasing temperatures.

FIG. 9(a) shows interfacial tension measurement results for two kinds of liquid pairs; silicon oil (continuous phase) and 50 wt % glycerol (dispersed phase), and mineral oil (continuous phase) and 50 wt % glycerol (dispersed phase). The open and closed symbols denote the results obtained using pendant drop and microfluidic tensiometers of the embodiment of the present disclosure, respectively.

FIG. 9(b) shows probability density and Gaussian distribution of measurements obtained by microfluidic method of the present invention and the pendant drop method.

DESCRIPTION OF EMBODIMENTS

The present disclosure provides, in one aspect, a temperature controllable microfluidic device for the accurate measurement of temperature dependent interfacial tensions between two immiscible liquids. A localized temperature control system is integrated with the microfluidic platform to maintain accurate temperature inside the device. The temperature uniformity and sensitivity are verified by both simulation and experiment. Temperature dependent interfacial tensions are measured dynamically and rapidly relying on quantitative analysis of the deformation and retraction dynamics of droplets under extensional flow. Various embodiments of the disclosed microfluidic tensiometry offer the capability of measuring temperature dependent interfacial tensions with precise and systematical temperature control in the range of room temperature to 70° C., for example, which is valuable for studying transient interfacial dynamics, interfacial reactions, and surfactant adsorption process.

<I. Device Structure>

The microfluidic tensiometer disclosed herein comprises an emulsion droplet production region at a T-junction, a co-flowing region, and a flow constriction region to deform the droplets, with precise on-chip temperature control. FIG. 1 schematically shows a construction of microfluidic tensiometer according to an embodiment of the present disclosure. In FIG. 1, a) is a schematic perspective view of the device, b) is an enlarged view of a microchannel in which droplets travel, and c) is an enlarged top view of the device. As shown in a) through c), in this embodiment, a microheater and a temperature sensor are formed alongside the microchannel on a slide glass. The microchannel is defined by a patterned PDMS block disposed on the slide glass. As shown in b) and c), droplets move towards the region containing a microheater and a constriction area at the far right of the microchannel. The droplets elongate along the flow direction before entering the constriction region.

FIG. 2 shows more details of the device of this embodiment. In FIG. 2, a) is a perspective view of the device, and b) is a perspective view of a cut-out cross-section of the device. As shown in these figures, on a glass substrate (glass slide), patterned microheater and temperature sensor are formed, and a block made of, for example, PDMS, is disposed thereon to define various structures, such as inlets, outlets, and microfluidic channel. As shown in b) and c) in FIG. 1 above, microheater and temperature sensors are disposed along both sides of the microfluidic channel and, in this embodiment, each have repeated rectangular-wave patterns with the microheater pattern being on the inner side. The microchannel has a narrower width portion as a constriction region at the right-hand side of the microchannel.

<II. Principle of Measurements>

By manipulating the flow rates of the continuous $Q_c$ and dispersed phases $Q_d$, emulsion drops can be produced at the T-junction, and the droplet size is determined by the flow rate ratio ($Q_c/Q_d$). The droplet sizes are adjusted between 0.2 h and 0.8 h to exclude any confinement effect, with h being the channel height of the microdevice. If the droplet size is close to the microchannel size, it can lead to incorrect prediction of low interfacial tension (NPL 32). The droplets then flow downstream and are accelerated by two additional co-flowing symmetric streams (see a) and c) of FIG. 1). Further downstream in the constriction region, the flow accelerates and produces an extensional flow field (see c) in FIG. 1). Droplets are deformed as they pass through the constriction region due to the extensional flow field, which stretches the droplets along the flow direction. An early study for the droplet deformation under extensional flow field was established by Taylor in which four-roller apparatus was used to characterize the distortion of a droplet (dispersed phase) by the viscous forces associated with the continuous phase fluid (NPL 23). The deformation of small viscous droplets in extensional flows was further studied theoretically by Rallison (NPL 24). In their model, it is assumed that the droplets flow through the microchannel along the x-direction (flow direction), and the deformation takes place under the extensional flow. The time dependent droplet distortion can be described as $$\frac{\partial D(x,T)}{\partial t} = \frac{5}{2\hat{\eta}(T)+3}\dot{\varepsilon}(x) - \sigma(T)\frac{D(x,T)}{\alpha(T)\eta_c(T)a_0(T)}, \quad (1)$$

where $a_0(T)$ is the equilibrium droplet radius, $D=(l-b)/(l+b)$ is the droplet deformation, l and b are the largest and smallest distances of the droplet surface from its center, t is the time, T is the temperature, x is the spatial variable along the flow direction, $\hat{\eta}(T)=\eta_d(T)/\eta_c(T)$ is the relative viscosity between the dispersed phase ($\eta_d(T)$) and the continuous phase ($\eta_c(T)$) at a given temperature T, and $\alpha(T)\eta_c(T)$ is the effective viscosity with $$\alpha(T) = \frac{(2\hat{\eta}(T)+3)(19\hat{\eta}(T)+16)}{40(\hat{\eta}(T)+1)}. \quad (2)$$

The instantaneous deformation of a droplet can further be expressed in a convenient form (NPL 32) by considering unidirectional time-invariant extensional flow with the extension rate $\varepsilon=du/dx$. In addition, $$\frac{dD}{dt} = \frac{\partial D}{\partial x}\frac{\partial x}{\partial t} = u\frac{\partial D}{\partial x}.$$

Here, u is the droplet velocity along the x-direction. Rearranging Eq 1 yields:

$$\alpha(T)\eta_c(T)\left(\frac{5}{2\hat{\eta}(T)+3}\dot{\varepsilon}(x) - u(x)\frac{\partial D(x,T)}{\partial x}\right) = \sigma(T)\frac{D(x,T)}{a_0(T)} \quad (3)$$

The first term of left hand side (LHS) of Eq 3 gives the steady state deformation and is governed by $\dot{\varepsilon}$. The second term corresponds to the time dependent droplet deformation. Since the droplet accelerates rapidly in a constriction region, the instantaneous deformation of the droplet lags its steady state deformation. In this general case, the droplet dynamics history should also be considered. All parameters in the LHS of Eq 3 and $$\frac{D(x,T)}{a_0(T)}$$

can be either measured directly from high speed microscopy imaging or rheological characterizations. By plotting the LHS of Eq 3 against $$\frac{D(x,T)}{a_0(T)},$$

the slope of the best linear fit yields the interfacial tension value $\sigma(T)$ between the two fluids for a given temperature T. For two Newtonian fluids, this relationship is valid as long as D<0.15 since the Taylor theory for the droplet deformation is found to be valid experimentally for modest deformations (NPLs 23, 24).

The key physical parameters affecting the interfacial tension in this droplet-based microfluidic tensiometry are $\eta_c(T)$, $\eta_d(T)$, $\alpha(T)\eta_d(T)$, and $D(x, T)$. $D(x, T)$ is primarily governed by the viscous drag force ($F_d$) of the carrier fluid. Here, $F_d$ is related to $\hat{\eta}$ under the assumption that the tangential stress parallel to the surface of the droplets is continuous and there is no slippage at the surface of the droplet. Viscosity related parameters ($\eta_c(T)$, $\eta_d(T)$, $\alpha(T)\eta_d(T)$) become the most influential factors instead of the densities of the two fluids, which are crucial for the pendant drop method at liquid-liquid interfaces.

<III. Device Fabrication>

FIG. 3 schematically shows manufacturing processes of the device of the embodiment of the present invention by illustrating cross-sectional views in each representative step. Soft-lithography protocol was used for fabrication of the microfluidic channel. The microheater and temperature sensor were made of conductive wires. Wet etching process was used for patterning the conductive wires for microheater and temperature sensor. Some details for the methods of wet etching are explained in our previous work (NPL 31). In this embodiment, as shown in FIG. 3, a glass slide (EMF, CA-134) with a 1000 angstrom thick gold film on a 50 angstrom thick chrome adhesion layer was used as a substrate. The glass slide was spincoated with a positive photoresist (Microchem, AZ-1512) with 3000 RPM for 30 sec to achieve 1 μm thickness. The exposure process was carried out by using a maskless lithography system (Dlight DL-1000, Nanosystem, Japan) under exposure intensity of 300~mJ/cm². The glass slide was baked at 110° for 1 hour. Wet etching process was then carried out by immersing the glass slide into a gold etchant (TFA gold etchant, Transene) for 30-35 sec, followed by immersing the glass slide immediately in a chrome etchant (TFA chromium etchant, Transene) for 5-10 sec. The glass slide was rinsed by acetone to remove residual photoresist, followed by washing with water, and dried by nitrogen gas. The glass slide was deposited with 100 nm silicon dioxide to prevent any electrolysis and dielectrophoresis.

The microfluidic channel was fabricated by using a standard soft-lithography method (see FIG. 3) Either PDMS or SU-8 epoxy substrate can be used. In this embodiment, PDMS was used. The photoresist was spin-coated onto a 4 inch silicon wafer with 1050 RPM for 30 sec to fabricate the master with the thickness of 150 μm. The glass slide with wire patterning and the microchannel were bonded together after exposing them under oxygen gas for 1 min. In more detail, a photoresist was spincoated onto a clean silicon wafer. Then, the silicon wafer was baked on a hot plate at 50° C. for 5 minutes and 85° C. for 12 minutes. An exposure process was carried out by using either a maskless writer or mask aligner under wavelength of 365 nm for 20-30 sec. The exposed silicon wafer was baked on a hot plate at 50° C. for 5 minutes and 85° C. for 12 minutes. Thereafter, the exposed silicon wafer was developed by a photoresist developer for 3-6 minutes. The developed silicon wafer was rinsed with water, followed by drying with air, creating a photoresist mold. The microchannel was fabricated by casting Polydimethylsiloxane (PDMS) at 10:1 ratio of base resin and crosslinker onto the corresponding silicon wafer. The silicon wafer mold was baked in a convection oven at 60° C. for 3 hours. Then the resultant PDMS replica was peeled off from the wafer mold. The PDMS replica and glass slide patterned with the microheater were exposed to either oxygen plasma or air plasma for 1 minute. The PDMS replica was aligned with the microheater to form an integrated monolithic device. The integrated microfluidic device was placed on a hot plate at 90° C. for 1 hour to make strong bonding, thereby completing the fabrication of the device of the present embodiment.

<IV. Temperature Control and Image Analysis>

On-chip temperature control is accomplished by employing a custom designed LabVIEW virtual interface that is connected to a power supply and a digital multimeter. A pair of microheater and temperature sensor is located along the centerline of the microchannel (see a) to c) of FIG. 1 above). The inner and outer serpentine patterns (or rectangular wave like patterns) shown in the figures are the microheater and temperature sensor, respectively. A high precision programmable power supply (BK Precision, 9124) is used as a power source for the microheater. For the temperature controller, a microcontroller board (Arduino, UNO-R3) is used to input a programmed pulse width modulation (PWM) to a MOSFET switch module for the fine current control over the heating power of the microheater. A digital multimeter (Keithley, 2700 with 1300 switch module) is used to measure the resistance of the temperature sensor, which is converted to the temperature reading by the resistance-temperature relation obtained from the temperature sensor calibration. Syringe pumps (Cetoni, neMESYS Base 120) are used to introduce fluids inside the microfluidic channel.

To observe the droplet dynamics, the microfluidic device is placed on an inverted microscope (Nikon, Eclipse Ti-U). Once the droplets are formed at T-junction and move towards the constriction region, droplet images are recorded by a high speed camera (Phantom vision research, M310) with the resolution of 720×800 pixels and 2000 frames per second (fps) to capture the droplet deformation. High speed imaging provides accurate droplet position since the experimental error mainly comes from transit time t(x), from which u(x) and ε(x) are derived. At least a hundred of pictures are captured for each droplet within the processing region and processed to identify the center of mass, and then obtain t(x), u(x), ε(x), and droplet deformation D=(l−b)/(l+b), where l and b are the largest and smallest distances of the droplet surface from its center (see b) in FIG. 1).

<V. On-Chip Temperature Control—Numerical Simulations and Experimental Results>

A Joule heating arises when an electric energy is converted to heat through resistive losses in the material. The resistive chrome layer causes the Joule heating when a voltage is applied to the micropatterned wires (i.e., the microheater). To examine the temperature profile created by the microheater integrated in the microfluidic device, the following basic heat transfer principle was applied for temperature profile simulation.

The heat transfer is governed by $$\rho C_p \frac{\partial T}{\partial t} + \nabla \cdot (k\nabla T) = Q \quad (4)$$

where p, $C_p$, T, t, k, and Q are the density, specific heat, temperature, time, thermal conductivity, and heat source, respectively. The heat transfer equation is solved with the heat source produced by the microheater. The heat source per unit volume produced inside the microheater is given by $Q = J \cdot E = \sigma(\nabla V)^2$, where $J = \sigma E$ is the current density, $E = \nabla V$ is the electric field which is determined by the gradient of the electrical potential, and σ is the electrical conductivity of the microheater. Well-known values were used for the simulation parameters representing the properties of the materials, such as gold, nichrome, water, glass, and air, used in the numerical simulations. We assume that the microheater is in direct contact with the fluid, and its back side is in contact with the glass slide. FIG. 4 shows simulation conditions as well as the results of the numerical simulation. In FIG. 4, a) shows boundary and initial conditions imposed in solving the heat transfer equation; b) shows resulting electric field potential; c) temperature distribution, and d) temperature gradient distribution, obtained by the numerical simulations. In FIG. 4, e) shows the fluorescence intensity of Rhodamine B in aqueous solutions inside the epoxy based microchip, captured using a fluorescence microscope at 20° C. and 40° C. During the operations, the microheater layer produces heat which becomes the heat source. The heat source propagates as an inward and outward heat flux at the surfaces of the fluid and the glass side, respectively. As the system reaches steady state condition, the microheater dissipates the heat on its up-side toward the fluid, and on its down-side toward the glass slide. Convective heat flux $q_0 = H(T_{ext} - T)$ is applied to the microheater side by using the heat transfer coefficient and temperature of liquid, and the back side of the microheater is in contact with the glass. Here, $T_{ext}$ is the temperature of liquid ($T_{water}$) and T is the temperature imposed by the resistive heating. The edges of the glass slide and microchannel are assumed to be insulated thermally (n·q=0). An electric potential of 5 Volt is applied to one end of the microheater ($V_{electric}$) and the other end ($V_{ground}$) is grounded to characterize temperature change through the microheater. Solving the heat equation Eq 4 with boundary conditions summarized in a) in FIG. 4, the gradient of electric potential is shown to be uniform throughout the microheater assuming that the width of the micropattern is perfectly constant (b) in FIG. 4). The uniform gradient of electrical potential can generate the uniform temperature over the microheater (c) in FIG. 4). The simulation shows that the temperature gradient along the centerline of the microheater is almost constant even through it is slightly higher at the entrance than that at the exit of the microheater, which results from the sudden contraction of the width of the heater (d) in FIG. 4).

Temperature mapping based on fluorescent signal intensity ratios is widely used to investigate temperature distributions experimentally. Here, we used Rhodamine B as a temperature-sensitive fluorescent molecule to detect in-situ temperature profile inside the microchannel. However, Rhodamine B can be absorbed onto PDMS substrates, which can introduce errors with temperature verification. To verify the temperature inside the microdevice more accurately, we further fabricated epoxy-based SU-8 microchips as epoxy-based materials tend to have minimum chemical absorption. We then carried out the intensity verification experiment using the new set of epoxy devices. It was confirmed that the SU-8 microchip shows a significant improvement over PDMS based device, displaying an inhibition of the absorption of Rhodamine B into the chip until the time reached 30 min. However, a small amount of surface adsorption of Rhodamine B persisted, due to its adsorption to negatively charged epoxy surface. Then, we measure the fluorescent intensity in the SU-8 microchannel at different temperatures ranging at 25° C.≤T≤70° C. See examples in e) in FIG. 4.

FIG. 5 shows temperature validation and control through the integrated device. In FIG. 5, a) shows temperature gradient along the centerline in the microheater obtained by numerical simulation and experiment at 40° C., and b) shows the set temperatures (Ts) that were varied from room temperature to 70° C., and the resulting detected temperature ($T_D$) measured by the temperature sensor. The inset graph in b) denotes a histogram of localized temperature control error once $T_D$ reaches Ts. The fluorescent signals at room temperature and at a specific temperature are defined as S(RT) and S(T), respectively. The normalized fluorescent intensity is then defined as:

$$I(T) = \frac{S(T)}{S(RT)}. \quad (5)$$

The calibration curve was then obtained in the temperature range of 25° C.≤T≤70° C. with as many as 100 data points, showing a linear trend (left inset in a) FIG. 5). Thus, the normalized intensity of Rhodamine B I(T) can be fitted to a linear curve, showing the following empirical conversion rule:

$$T = \frac{1.52 - I(T)}{0.02}. \quad (6)$$

Next, the fluorescent intensity along the x-direction was measured in the microchannel at a given temperature. The intensity was fitted with a second order polynomial curve (right inset in a) in FIG. 5). Applying the chain rule among the temperature, intensity and x-position, Eq 6 yields $$\frac{dT}{dx} = \left(\frac{dT}{dI}\right)\left(\frac{dI}{dx}\right) = -50\left(\frac{dI}{dx}\right).$$

Based on this relationship, we obtained the experimental values of temperature gradient dT/dx along x-direction. As shown a) in FIG. 5, the measured spatial temperature variation through the device represented almost zero temperature gradient along x-direction, which shows good agreement with the simulation results. We also measure the dT/dx at different Y-locations in which dT/dx does not change significantly with different Y-locations. Given that the length of the processing region for droplet deformation is on the order of 1 mm, the small temperature variation offers a reliable and accurate measurement of IFT of immiscible or partially miscible liquids.

An average detected temperature $T_D$ in the device is also monitored by the temperature sensor while the set temperature $T_S$ is imposed through the microheater with the help of an active feedback control of the LabVIEW code. A stepwise $T_S$, function was imposed to increase the temperature (FIG. 5b). The active feedback controller restricts the current applied to the microheater in order to limit $T_D<T_S$. We confirmed that a relative standard deviation between $T_S$ and $T_D$ is as small as σ=0.0755° C. once the temperature reaches an equilibrium temperature (inset in b) in FIG. 5. This experimental validation indicates that the integrated microfluidic tensiometry platform of the present embodiment of this disclosure offers direct real-time temperature control with high precision and fast response that are critical to characterize temperature dependent or transient interfacial tensions.

<VI. IFT Measurement via Droplet Deformation>
<VI-1. IFT Measurement at Room Temperature>

The real-time droplet tracking and the measurement of IFT were performed by the methodology explained above using the device of the embodiment of the present disclosure. FIG. 6 shows various data concerning real-time droplet tracking to obtain interfacial tension between silicone oil (continuous phase) and 50 wt % glycerol (dispersed phase) at room temperature. In FIG. 6, a) shows transit time t(x); b) shows extension rate ($ε^{-1}$) along the center-of-mass of a droplet; c) shows dimensionless deformation parameter D normalized by drop size $a_0$ (inset graph represents minimum and maximum droplet diameters); d) shows experimental data collected during a time interval, with the slope representing the interfacial tension a based on Eq 3, in which the solid line is the linear curve fit. At a given temperature T, the position of the center-of-mass of each droplet is tracked along the x-direction to obtain the transit time t(x) and the corresponding velocity u(x), see b) in FIG. 1 and a) in FIG. 6. A cubic smoothing spline curve is used to fit u(x) for efficient curve fitting. The extensional flow rate $\dot{ε}(x)$=du/dt is obtained by differentiating the velocity with time (see b) in FIG. 6). The droplet deformation parameter D(x)=(l−b)/(l+b) is obtained along the x-direction (see c) in FIG. 6). D(x) is also fitted to a smoothing spline curve to rule out high deformation values above 0.15. Derivatives of the polynomial fit of D(x) yield ∂D(x, T)/∂x. Referring to Eq 3, parameters $\dot{ε}(x)$, u(x), D(x), ∂D/∂x,$a_0$) are obtained from the real-time droplet tracking while rheological parameters (α, $η_c$, $\hat{η}$) are measured by a shear bulk rheometer. The interfacial tension σ can then be extracted directly from Eq 3 by linear curve fit (see d) in FIG. 6). This linear fit is valid over moderate deformations of 0.3≤D(x)/$α_0$≤2 following a confinement criteria proposed by Cabral et al. (NPL 32). Upon the condition that the temperature of the system does not change, the error of D(x)/$α_0$ is dominated by the curve fitting and its derivative ∂D/∂x. IFT can vary as much as 15% when the deviation of the major or minor radii of the droplet reaches 1%.

Four liquid pairs (water or aqueous glycerol droplets in a carrier fluid of oil or air bubbles in a carrier fluid of aqueous glycerol) were also examined to obtain IFT at room temperature using the microfluidic tensiometry of the present embodiment of the present invention. The measured values are compared with the values obtained from a conventional pendant drop method (FIG. 7). FIG. 7 shows data for interfacial tension measurement of four individual droplets (water, aqueous glycerol or air) in different carrier fluids at room temperature; the droplet deformation D/$a_0$ is imaged and calculated as the droplet travels through the microfluidic device. The solid lines are linear regressions to the experimental data for each individual droplet, with the slope representing the interfacial tension (mN $m^{-1}$). The data in parentheses were obtained by the pendant drop method. As shown in the figures, at room temperature, IFTs measured by the microfluidic tensiometry are in good agreement with the results obtained by the pendant drop tensiometry.

<VI-2. Temperature Dependent IFT>

After validating the performance of the microfluidic tensiometer at room temperature, the temperature dependent tensiometer performance was measured. For the pendant drop method, forced thermal convection due to temperature gradient caused by the heating stage or chamber is bound to occur during the experiment, which may distort drop shape during image analysis. For the droplet-based microfluidic tensiometer, the platform requires only a small amount of sample volume and the fluid flow is continuous through the device so that forced thermal convection and temperature gradient along the channel can be minimized. To investigate the temperature effect on IFT, silicone oil and 50 wt % aqueous glycerol were used as a carrier and dispersed phase, respectively. FIG. 8 is a Taylor plot showing experimental analysis of 50 wt % aqueous glycerol droplet deformation in silicone oil at various temperatures; droplet deformation decreases as the temperature of the system increase. The Taylor plot shown in FIG. 8 indicates that the slope (equivalent to interfacial tension) decreases with increasing temperatures. As shown in the figure, the slope between silicone oil and 50 wt % aqueous glycerol decreases with increasing temperatures. The deformation of the droplets along the flow direction at various temperatures in the range of 22 to 70° C. with the flow rate of 1000 μl/hr was also determined. It was found that interestingly, the droplet deforms less at high temperature since the viscosity of the carrier fluid decreases significantly with increasing temperatures, resulting in less drag force by the carrier fluid to the droplet. Here, the shear viscosities of the samples were measured by using a strain-controlled rheometer (ARES-G2, TA instruments) at a shear rate of 500 s$^{-1}$ with a heat break steel parallel plate (400 mm in diameter). Thus, it was found that IFT is reduced with increasing temperatures.

To investigate the influence of the effective viscosity and the droplet deformation on the IFT measurement, we compared IFT measurements of two types of liquid pairs which have different temperature dependency on IFT. FIG. 9(a) shows interfacial tension measurement results for two kinds of liquid pairs; silicon oil (continuous phase) and 50 wt % glycerol (dispersed phase), and mineral oil (continuous phase) and 50 wt % glycerol (dispersed phase). The open and closed symbols denote the results obtained using pendant drop and microfluidic tensiometers of the embodiment of the present disclosure, respectively. For 50 wt % aqueous glycerol/silicone liquids, the effective viscosity $\alpha(T)\eta_c(T)$ decreases with increasing temperature since $\eta_c(T)$ (silicone oil) decreases faster than $\eta_d(T)$ (50 wt % glycerol). In Eq 3, temperature dependent parameters are $\eta_c(T)$, $\eta_d(T)$, $\alpha(T)\eta_d(T)$ and D(x, T). Therefore, σ(T) becomes proportional to the ratio between the drag force and interfacial tension force. Since the droplet-based microfluidic approach depends on the droplet deformation under extensional flow field, deformation factor D(x, T) is a primary factor to determine IFT. IFT becomes small when D(x, T) is large under the condition that viscosity properties such as $\alpha(T)$ and $\hat{\eta}(T)$ are fixed. However, when both $\alpha(T)$ and $\hat{\eta}(T)$ change with temperature, σ(T) is determined by the ratio of $\alpha(T)\eta_c(T)/D(x, T)$. As a result, the change of $\alpha(T)\eta_c(T)$ leads to decreasing IFTs even though the droplet deforms less upon temperature increase. For the case of 50 wt % glycerol/mineral oil, the effective viscosity does not change significantly over temperature change, leading to relatively small decrease of IFT upon temperature increases.

The IFT was also measured by the pendant drop method to compare the values with the droplet-based microfluidic approach. FIG. 9(b) shows probability density and Gaussian distribution of measurements obtained by microfluidic method of the present invention and the pendant drop method. The key reason we used the pendant drop method to validate our microfluidic based tensiometer is their ability to control the environmental temperature with a temperature chamber, which provides reasonable accuracy within a short period of time with small sample volume requirement. However, force balance methods (e.g., Wihelmy plate and Du Nouy ring) take much longer time to prepare and load samples in a trough before measurement. For temperature related measurement, liquid evaporation might become an issue with increasing temperature since the trough (where samples are loaded) is large and open directly to the air, causing measurement errors. In comparison to the force measurement, the pendant drop method was selected as the best comparison tool to our microfluidic approach for the measurement of temperature dependent interfacial tensions.

As expected, the data obtained from both methods exhibit a similar trend with temperature variations. The droplet-based microfluidic tensiometer gives more reproducible data with a low deviation compared to those from the pendant drop method, likely caused by forced thermal convection in a fluid chamber when the temperature is increased in the pendant drop setup. For both measurement approaches, a large number of measurements are performed for each temperature to obtain the median IFT value. The distribution of a Gaussian function in FIG. 9(b) shows the median IFT with statistical uncertainty. The values obtained by pendant drop method show a broader distribution compared to that from the microfluidic tensiometer.

The temperature controlled tensiometer with droplet-based microfluidics described in this disclosure can provide accurate measurements in several scenarios, as follows. (1) Interfacial reaction and/or interfacial mass transfer occurring on the interface. The interfacial reaction and/or mass transfer is typically fast and temperature dependent. Reaction rates at interfaces become significantly different over temperature variations since the reaction process (involving potential energy surface and activation energy of the reaction) is determined thermodynamically. (2) Transient interfacial tension of liquid systems undergoing immiscible-to-miscible transitions over rapid temperature jumps can be investigated. Our platform allows one to control and induce rapid and temperature transitions in a localized region. This platform can capture transitions from immiscible to miscible liquid transitions such as Isobutyric acid (IBA) and water pair which has an upper critical solution temperature (UCST). (3) Phase change and/or separation systems. Liquid crystals (LCs) are a good example where phase change occurs at a critical temperature wherein molecular orientation inside the LC drop changes. Nanoscale phase separation takes place by controlling the kinetics and thermodynamics of film formation and molecular chain structure. In such cases interfacial dynamics at liquid interfaces can be measured upon the nanoscale phase separation. We expect our temperature controllable microfluidic platform becomes valuable for studying multiphase flow dynamics, which are ubiquitous in many industrial and biotechnology processes such as filtration and precipitation, oil refinery, food, cosmetic, and pharmaceutical industries.

In this disclosure, a novel temperature controlled microfluidic tensiometer is provided in order to measure temperature dependent interfacial tensions of immiscible fluids. This microfluidic platform allows the rapid and consistent measurement of interfacial tension due to contaminant-flee clean environment, low thermal convection of fluids, and precisely controlled temperature on-chip. In one aspect, the serpentine microheater integrated with the microfluidic device possesses low temperature gradients along the flow direction and low temperature variation once reaching equilibrium temperature, which provides precise temperature control in the device for accurate measurements of interfacial tensions. It is expected that the present microfluidic tensiometry is useful for investigating the transient and dynamic behavior of immiscible-to-miscible liquid pairs, which is critical to many industrial applications such as oil refinery from crude oil and phase separation in biopolymer systems.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A temperature-controllable microfluidic device, comprising:
    a microfluidic channel generally extending in a first direction for passing a specimen fluid;
    a microheater disposed along the microfluidic channel, the microheater being made of a first resistive wire having a first pair of serpentine-shaped portions generally extending in the first direction along respective sides of the microfluidic channel, a portion of the first resistive wire connecting the first pair of serpentine-shaped portions at adjacent ends of the serpentine-shaped portions; and
    a temperature sensor disposed along the microfluidic channel, the temperature sensor being made of a second resistive wire having a second pair of serpentine-shaped portions generally extending in the first direction along the respective sides of the microfluidic channel.

2. The temperature-controllable microfluidic device according to claim 1, wherein said second pair of serpentine-shaped portions of the temperature sensor is disposed alongside said first pair of serpentine-shaped portions of the microheater at outer sides thereof relative to the microfluidic channel.

3. The temperature-controllable microfluidic device according to claim 1, wherein said second pair of serpentine-shaped portions of the temperature sensor and said first pair of serpentine-shaped portions of the microheater both have a rectangular wave shape.

4. The temperature-controllable microfluidic device according to claim 1, wherein said microheater and said temperature sensor are disposed on a glass substrate, and said microfluidic channel is defined by a patterned block disposed on the glass substrate.

5. The temperature-controllable microfluidic device according to claim 1, wherein the microfluidic channel has a constriction portion having a width narrower than a main portion of the microfluidic channel.

6. A method of measuring temperature-dependent interfacial tensions between two liquids using a microfluidic device, said microfluidic device comprising:
    a microfluidic channel generally extending in a first direction for passing a specimen fluid, microfluidic channel having a constriction portion having a width narrower than a main portion of the microfluidic channel;
    a microheater disposed along the main portion of the microfluidic channel, the microheater being made of a first resistive wire having a first pair of serpentine-shaped portions generally extending in the first direction along respective sides of the main portion of the microfluidic channel, a portion of the first resistive wire connecting the first pair of serpentine-shaped portions at adjacent ends of the serpentine-shaped portions; and
    a temperature sensor disposed along the main portion of the microfluidic channel, the temperature sensor being made of a second resistive wire having a second pair of serpentine-shaped portions generally extending in the first direction along the respective sides of the main portion of the microfluidic channel,
wherein the method comprises:
    introducing a mixture of two liquids in the microfluidic channel so as to form a droplet of one liquid immersed in another liquid and move the droplet in the first direction;
    driving the microheater and feed-back controlling and regulating temperature inside the microfluidic channel by monitoring the temperature via the temperature sensor;
    imaging a deformation of the droplet as the droplet moves in the microfluidic channel using an imaging device; and
    calculating an interfacial tension between the two liquids in accordance with the deformation of the droplet imaged by the imaging device.

7. The method according to claim 6, wherein said second pair of serpentine-shaped portions of the temperature sensor is disposed alongside said first pair of serpentine-shaped portions of the microheater at outer sides thereof relative to the microfluidic channel.

8. The method according to claim 6, wherein said second pair of serpentine-shaped portions of the temperature sensor and said first pair of serpentine-shaped portions of the microheater both have a rectangular wave shape.

9. The method according to claim 6, wherein said microheater and said temperature sensor are disposed on a glass substrate, and said microfluidic channel is defined by a patterned block disposed on the glass substrate.

10. A temperature-controllable microfluidic tensiometer for measuring interfacial tensions between two fluids, comprising:
    a microfluidic channel generally extending in a first direction for passing a specimen fluid having a droplet of one liquid immersed in another liquid, the microfluidic channel having a constriction portion having a width narrower than a main portion of the microfluidic channel;
    a microheater disposed along the main portion of microfluidic channel, the microheater being made of a first resistive wire having a first pair of serpentine-shaped portions generally extending in the first direction along respective sides of the main portion of the microfluidic channel, a portion of the first resistive wire connecting the first pair of serpentine-shaped portions at adjacent ends of the serpentine-shaped portions;
    a temperature sensor disposed along the main portion of the microfluidic channel, the temperature sensor being made of a second resistive wire having a second pair of serpentine-shaped portions generally extending in the first direction along the respective sides of the main portion of the microfluidic channel;
    one or more controllers connected to the microheater and the temperature sensor to drive the microheater and detect temperature in the microfluidic channel via the temperature sensor, the one or more controllers feed-back controlling and regulating the temperature; and
    an imaging device that takes images of the droplet as the droplet moves in the microfluidic channel.

11. The temperature-controllable microfluidic tensiometer according to claim 10, wherein said second pair of serpentine-shaped portions of the temperature sensor is disposed alongside said first pair of serpentine-shaped portions of the microheater at outer sides thereof relative to the microfluidic channel.

12. The temperature-controllable microfluidic tensiometer according to claim 10, wherein said second pair of serpentine-shaped portions of the temperature sensor and said first pair of serpentine-shaped portions of the microheater both have a rectangular wave shape.

13. The temperature-controllable microfluidic tensiometer according to claim 10, wherein said microheater and said temperature sensor are disposed on a glass substrate, and said microfluidic channel is defined by a patterned block disposed on the glass substrate.

* * * * *